United States Patent
Hirano et al.

(10) Patent No.: US 10,757,287 B2
(45) Date of Patent: Aug. 25, 2020

(54) IMAGE READING DEVICE, IMAGE FORMING APPARATUS, AND IMAGE READING METHOD

(71) Applicants: Noboru Hirano, Kanagawa (JP); Takayuki Shibata, Kanagawa (JP); Tatsuya Ishii, Kanagawa (JP)

(72) Inventors: Noboru Hirano, Kanagawa (JP); Takayuki Shibata, Kanagawa (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/559,637

(22) Filed: Sep. 4, 2019

(65) Prior Publication Data

US 2020/0106907 A1 Apr. 2, 2020

(30) Foreign Application Priority Data

Sep. 28, 2018 (JP) .................................. 2018-185853

(51) Int. Cl.
*H04N 1/00* (2006.01)
*H04N 1/024* (2006.01)

(52) U.S. Cl.
CPC ..... *H04N 1/02409* (2013.01); *H04N 1/00809* (2013.01); *H04N 1/0249* (2013.01); *H04N 1/02481* (2013.01)

(58) Field of Classification Search
CPC combination set(s) only.
See application file for complete search history.

(56) References Cited

FOREIGN PATENT DOCUMENTS

JP 2007-243664 9/2007

*Primary Examiner* — Barbara D Reinier
(74) *Attorney, Agent, or Firm* — Xsensus LLP

(57) ABSTRACT

An image reading device includes reading devices arranged in a main scanning direction perpendicular to a sub-scanning direction, position reference members each including a reference pattern for correcting relative positions of pixels in each of the reading devices or relative positions of the reading devices, and circuitry. The reference members move in the sub-scanning direction relative to the reading devices, and include first reference members for correcting the relative positions of the reading devices and second reference members for correcting the relative positions of the pixels in each of the reading devices. While switching between the first reference members and the second reference members, the circuitry calculates a correction value for a deviation of the pixels in each of the reading devices and a correction value for a deviation of the reading devices based on a result of reading of the reference members.

15 Claims, 20 Drawing Sheets

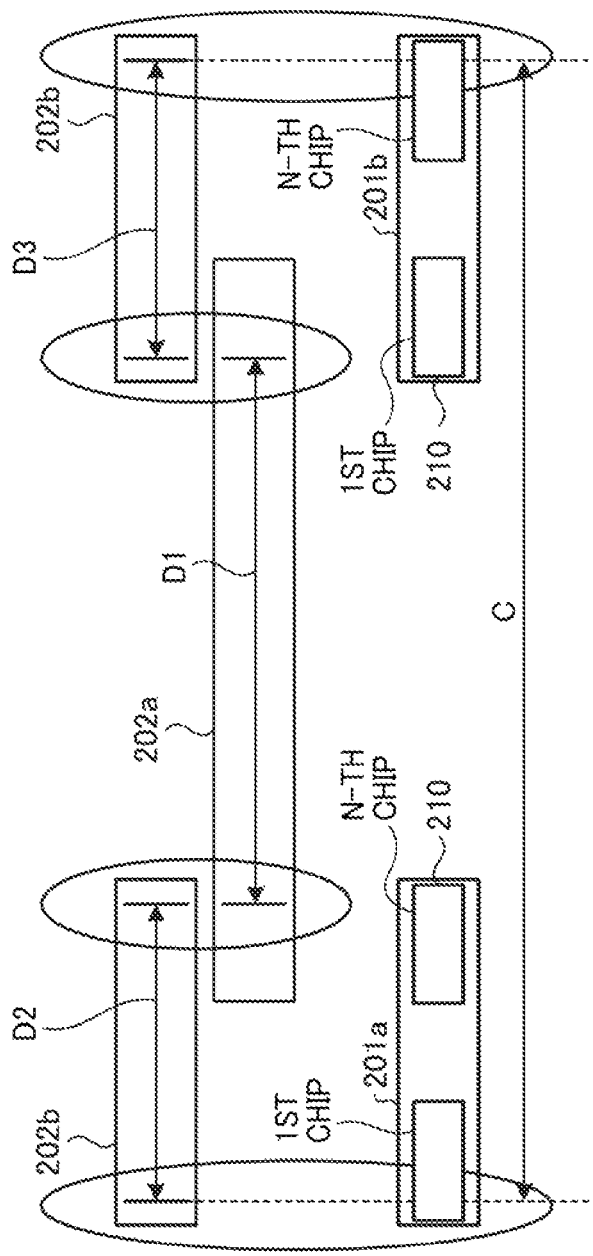

IMAGE READING DEVICE, IMAGE FORMING APPARATUS, AND IMAGE READING METHOD

CROSS-REFERENCE TO RELATED APPLICATION

This patent application is based on and claims priority pursuant to 35 U.S.C. § 119(a) to Japanese Patent Application No. 2018-185853 filed on Sep. 28, 2018 in the Japan Patent Office, the entire disclosure of which is hereby incorporated by reference herein.

BACKGROUND

Technical Field

The present invention relates to an image reading device, an image forming apparatus, and an image reading method.

Description of the Related Art

In a reading device formed with an array of a plurality of photoelectric conversion elements, the photoelectric conversion elements may be deviated in position owing to variation in position of the photoelectric conversion elements in the array or torsion or distortion of the reading device occurring in the installation of the reading device.

According to an existing technique, the image of a reference line is read to detect the deviation in position of the reading device and correct the position of the image.

In recent years, a plurality of reading devices have been used for a reading range that is too wide to cover with a single reading device.

According to a typical image position correcting method, however, an increase in the reading range results in an increase in size of a member holding the reference line and thus an increase in cost for obtaining a level of scale accuracy similar to that obtained by a small-sized member.

SUMMARY

In one embodiment of this invention, there is provided an improved image reading device that includes, for example, a plurality of reading devices, a plurality of position reference members, and circuitry. The plurality of reading devices are arranged in a main scanning direction perpendicular to a sub-scanning direction in which a reading target is transported. Each of the plurality of position reference members includes a reference pattern as a reference for correcting relative positions of a plurality of pixels in each of the plurality of reading devices or relative positions of the plurality of reading devices. The plurality of position reference members partially overlap the plurality of reading devices, and move in the sub-scanning direction relative to the plurality of reading devices. The plurality of position reference members include one or more first position reference members for correcting the relative positions of the plurality of reading devices and a plurality of second position reference members for correcting the relative positions of the plurality of pixels in each of the plurality of reading devices. The number of the one or more first position reference numbers is less than the number of the plurality of reading devices by one. The number of the plurality of second position reference members is equal to the number of the plurality of reading devices. Based on a result of reading of the plurality of position reference members by the plurality of reading devices, the circuitry calculates a correction value corresponding to a deviation of the relative positions of the plurality of pixels in each of the plurality of reading devices and a correction value corresponding to a deviation of the relative positions of the plurality of reading devices, while switching between the one or more first position reference members and the plurality of second position reference members.

In one embodiment of this invention, there is provided an image forming apparatus that includes, for example, the above-described image reading device and a print engine.

In one embodiment of this invention, there is provided an image reading method performed by an image reading device including a plurality of reading devices and a plurality of position reference members. The plurality of reading devices are arranged in a main scanning direction perpendicular to a sub-scanning direction in which a reading target is transported. Each of the plurality of position reference members includes a reference pattern as a reference for correcting relative positions of a plurality of pixels in each of the plurality of reading devices or relative positions of the plurality of reading devices. The plurality of position reference members partially overlap the plurality of reading devices, and move in the sub-scanning direction relative to the plurality of reading devices. The plurality of position reference members include one or more first position reference members for correcting the relative positions of the plurality of reading devices and a plurality of second position reference members for correcting the relative positions of the plurality of pixels in each of the plurality of reading devices. The number of the one or more first position reference numbers is less than the number of the plurality of reading devices by one. The number of the plurality of second position reference members is equal to the number of the plurality of reading devices. The image reading method includes, for example, reading the plurality of position reference members with the plurality of reading devices to obtain a reading result, and calculating a correction value corresponding to a deviation of the relative positions of the plurality of pixels in each of the plurality of reading devices and a correction value corresponding to a deviation of the relative positions of the plurality of reading devices while switching between the one or more first position reference members and the plurality of second position reference members.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 12A and 12B are diagrams illustrating a method of calculating relative positions in the main scanning direction of the reading devices of the first embodiment;

Figure 1:
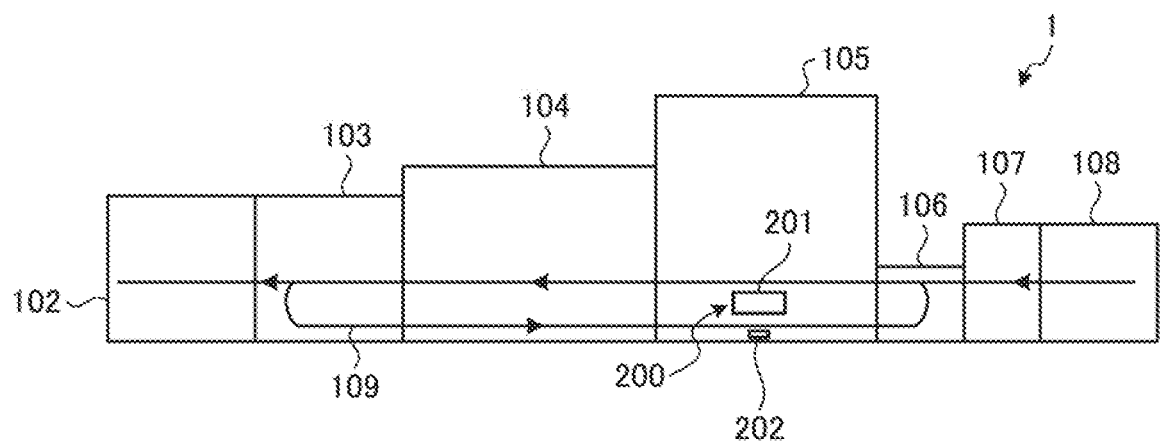
FIG. 1 is a schematic diagram illustrating an exemplary configuration of a printing system of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a". "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to the accompanying drawings, detailed description will be given below of embodiments of an image reading device, an image forming apparatus, and an image reading method of the present invention. The following description will be given of an example in which the image reading device and the image forming apparatus are applied to a printing system including a printing apparatus such as a commercial printing apparatus (e.g., a production printing machine) that performs continuous mass printing in a short time. The present invention, however, is not limited thereto.

A first embodiment of the present invention will be described.

A description will first be given of a hardware configuration of a printing system of the first embodiment.

FIG. 1 is a schematic diagram illustrating an exemplary configuration of a printing system 1 according to the first embodiment. As illustrated in FIG. 1, the printing system 1 is an image forming apparatus including a sheet ejecting device 102, a cooling device 103, a drying device 104, an image forming device 105, a registration device 106, a primer application device 107, and a sheet feeding device 108.

The sheet feeding device 108 stores a recording medium, which is an object to be processed (i.e., transported). The sheet feeding device 108 supplies the recording medium to a downstream device such as the image forming device 105. The recording medium is a recording sheet (i.e., transfer sheet), for example, but is not limited thereto. The recording medium may be any type of medium on which an image is recordable, such as coated paper, thick paper, an overhead projector (OHP) sheet, a plastic fin, or a copper foil, for example. In the present embodiment, the object to be processed (i.e., transported) is the recording medium on which an image is recorded. However, the object to be processed (i.e., transported) is not limited thereto, and may be a sheet not intended for forming an image thereon, such as a prepreg sheet.

The primer application device 107 applies primer liquid to the recording sheet (i.e., transfer sheet), which is the object to be processed (i.e., transported) supplied by the sheet feeding device 108. Thereby, ink supplied by the image forming device 105 effectively penetrates into different types of recording sheets.

The registration device 106 adjusts the time of transporting the recording sheet into the image forming device 105 and the position of the recording sheet with respect to the image forming device 105.

The image forming device 105 is an inkjet printer that forms an image by applying ink to the recording sheet. Although the image forming device 105 is an inkjet printer in the present embodiment, the image forming device 105 is not limited thereto, and may be an electrophotographic printer.

The drying device 104 has a function of drying the ink applied to the recording sheet by the image forming device 105 to make the ink penetrate into the recording sheet.

The cooling device 103 cools the recording sheet heated by the drying device 104.

In simplex printing, the cooling device 103 transports a printed material, i.e., the recording sheet with the image formed thereon, to the sheet ejecting device 102 located downstream of the cooling device 103. In duplex printing, the cooling device 103 transports to a reverse path 109 the recording sheet with the image formed thereon.

The thus-transported recording sheet is switched back on the reverse path 109 to be transported with the front surface and the rear surface thereof reversed. The recording sheet transported on the reverse path 109 is fed back to the image forming device 105, and an image is formed on a surface of the recording sheet different from the surface of the recording sheet having the image formed thereon in the last image formation. The recording sheet is then dried and cooled in the drying device 104 and the cooling device 103, respectively, and is transported downstream to the sheet ejecting device 102 as a printed material.

The sheet ejecting device 102 ejects the printed material generated through the image forming device 105, the drying device 104, and the cooling device 103.

The image forming device 105 includes a detector 200 including a plurality of reading devices 201 and a plurality of position reference members 202. The detector 200 detects the positions of end portions of the transported recording sheet and the position of the image recorded on the recording sheet to correct relative positions of the reading devices 201 and relative positions of pixels in each of the reading devices 201.

Each of the reading devices 201 may be implemented as a contact image sensor (CIS) including a plurality of imaging elements (e.g., complementary metal-oxide semiconductor (CMOS) image sensors) arranged in a line, for example. The reading devices 201 receive light reflected by a reading target, and output an image signal. Specifically, the reading devices 201 read a transport position to which the recording sheet subjected to the image formation in the image forming device 105 is transported and an image forming position at which the image formation is performed on the recording sheet. The reading devices 201 further read the position reference members 202.

The CIS applied to each of the reading devices 201 typically includes a plurality of sensor chips 210 (see FIG. 4) arranged in a main scanning direction and each including a plurality of pixels to cover an effective read length in the main scanning direction.

The position reference members 202 are reference plates for correcting the installation positions of the sensor chips 210 forming the reading devices 201. With the position reference members 202, the installation positions of the sensors chips 210 in the reading devices 201 are corrected to accurately detect the position of the image.

If the position reference members 202 are expanded or contracted by the heat generated in a nearby member, for example, the position reference members 202 fail to function as the absolute position reference, resulting in deterioration in accuracy of position detection. The position reference members 202 are therefore made of a material that has a linear expansion coefficient smaller than that of a material forming substrates of the reading devices 201 and is expanded or contracted by ambient temperature by a negligible degree in the position detection. In the present embodiment, the position reference members 202 are made of glass in consideration of the expected temperature fluctuation range and the linear expansion coefficient. However, the material forming the position reference members 202 is not limited thereto. If the reading devices 201 have a wide temperature fluctuation range, it is desirable to use quartz glass, for example, to accurately detect the position of the recording medium.

Figure 2:
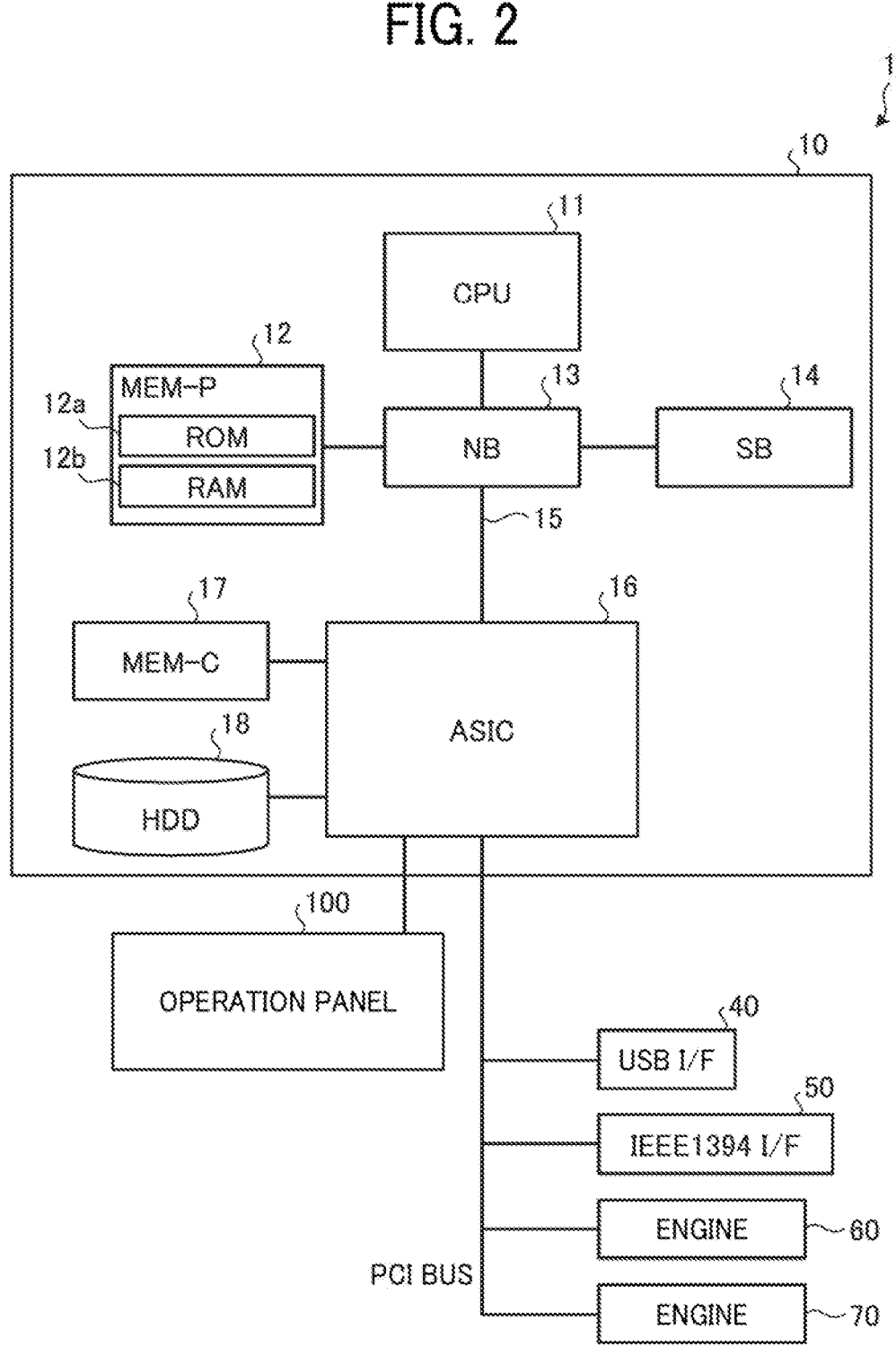
FIG. 2 is a block diagram illustrating exemplary electrical connection of hardware components of the printing system of the first embodiment.

FIG. 2 is a block diagram illustrating exemplary electrical connection of hardware components of the printing system 1.

As illustrated in FIG. 2, the printing system 1 includes a controller 10, an engine 60, and an engine 70, which are connected by a peripheral component interconnect (PCI) bus. The controller 10 performs overall control of the printing system 1, and controls rendering, communication, and input from an operation panel 100 that serves as an operation and display device. The engine 60 is connectable to a PCI bus, and is a scanner engine such as the detector 200, for example. The engine 60 includes an engine device and an image processing device that performs processes such as error diffusion and gamma conversion. The engine 70 is connectable to a PCI bus, and is a print engine such as the image forming device 105, for example.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. In the controller 10, an accelerated graphics port (AGP) bus 15 connects the NB 13 and the ASIC 16. The MEM-P 12 includes a read only memory (ROM) 12a and a random access memory (RAM) 12b.

The CPU 11 performs the overall control of the printing system 1, and includes a chipset including the NB 13, the MEM-P 12, and the SB 14. Via this chipset, the CPU 11 is connected to other devices.

The NB 13 is a bridge for connecting the CPU 11 to the MEM-P 12, the SB 14, and the AGP bus 15. The NB 13 includes a memory controller that controls writing and reading to and from the MEM-P 12, a PCI master, and an AGP target.

The MEM-P 12 is a system memory used as a memory for storing programs and data, a memory for deploying programs and data, or a rendering memory of a printer, for example. The ROM 12a of the MEM-P 12 is a read only memory used as the memory for storing programs and data. The RAM 12b of the MEM-P 12 is a readable and writable memory used as the memory for deploying programs and data or the rendering memory of a printer, for example.

The SB 14 is a bridge for connecting the NB 13 to a PCI device or a peripheral device. The SB 14 is connected to the NB 13 via a PCI bus, which is connected to a network interface (I/F), for example.

The ASIC 16 is an integrated circuit (IC) for image processing, which includes hardware elements for image processing. The ASIC 16 functions as a bridge connecting the AGP bus 15, the PCI bus, the HDD 18, and the MEM-C 17. The ASIC 16 includes a PCI target, an AGP master, an arbiter (ARB) forming the core of the ASIC 16, a memory controller that controls the MEM-C 17, a plurality of direct memory access controllers (DMACs) that rotate image data with hardware logic, for example, and a PCI device that transfers data via the PCI bus between the engines 60 and 70. The ASIC 16 is connected to a universal serial bus (USB) I/F 40 and an institute of electrical and electronics engineers (IEEE) 1394 I/F 50 via the PCI bus. The operation panel 100 is directly connected to the ASIC 16.

The MEM-C 17 is a local memory used as an image buffer and a code buffer. The HDD 18 is a storage for storing image data, programs, font data, and forms.

The AGP bus 15 is a bus interface for a graphics accelerator card proposed to increase the speed of graphics processing. The AGP bus 15 enables the graphics accelerator card to directly access the MEM-P 12 with high throughput to speed up graphics processing with the graphics accelerator card.

A program executed in the printing system 1 of the present embodiment may be provided as recorded on a computer-readable recording medium, such as a compact disc (CD)-ROM, a flexible disc (FD), a CD-recordable (R), or a digital versatile disk (DVD), in an installable or executable file.

Alternatively, the program executed in the printing system 1 of the present embodiment may be stored in a computer connected to a network such as the Internet, and may be provided as downloaded via the network. Further, the program executed in the printing system 1 of the present embodiment may be provided or distributed via a network such as the Internet.

The detector 200 will be described in more detail.

Figure 3:
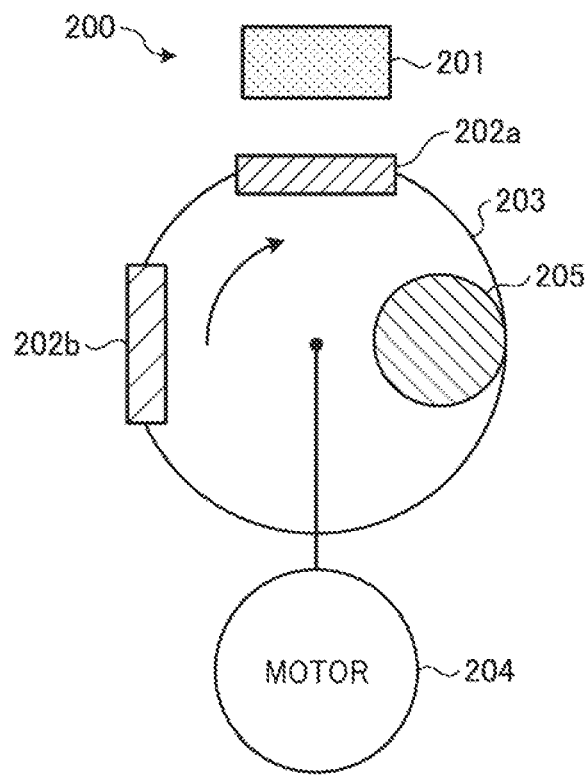
FIG. 3 is a schematic diagram illustrating an exemplary layout of reading devices and position reference members in the printing system of the first embodiment.

FIG. 3 is a schematic diagram illustrating a layout of the reading devices 201 and the position reference members 202. As illustrated in FIG. 3, the position reference members 202 include a position reference member 202a (i.e., a first position reference member) and position reference members 202b (i.e., second position reference members). The position reference members 202 (202a and 202b) are disposed on a rotary member (i.e., revolver) 203 that is driven to rotate by a motor 204. The position reference members 202 (202a and 202b) are moved by the rotary member 203, which is rotated at a constant speed by the motor 204. With the rotation of the rotary member 203, the position reference member 202a and the position reference members 202b are moved to alternately face facing surfaces of the reading devices 201 at a predetermined time.

Further, a reading background 205 is disposed on the rotary member 203. The reading background 205 is used to detect the positions of the end portions of the transported recording sheet and the position of the image recorded on the recording sheet, for example. With the rotation of the rotary member 203 driven by the motor 204, the position reference members 202 (202a and 202b) and the reading background 205 are selectably moved to a position facing the reading devices 201.

The position reference members 202 (202a and 202b) are rotated to read scales X in the main and sub-scanning directions (see FIG. 4) positioned on the position reference members 202 (202a and 202b). The scales X in the main and sub-scanning directions (hereinafter simply referred to as the scales X) form a reference pattern including lines each running in a predetermined direction. To detect installation tilt in the sub-scanning direction in the reading devices 201, the position reference members 202 (202a and 202b) are moved at a constant speed in the sub-scanning direction to read the scales X.

In FIG. 3, the position reference members 202 (202a and 202b) are attached to the rotary member 203 and moved at the constant speed in the sub-scanning direction. However, the position reference members 202 (202a and 202b) are not limited to this configuration. For example, the position reference members 202 (202a and 202b) may be configured to linearly move.

Relative positions of the reading devices 201 and the position reference members 202 will now be described.

Figure 4:
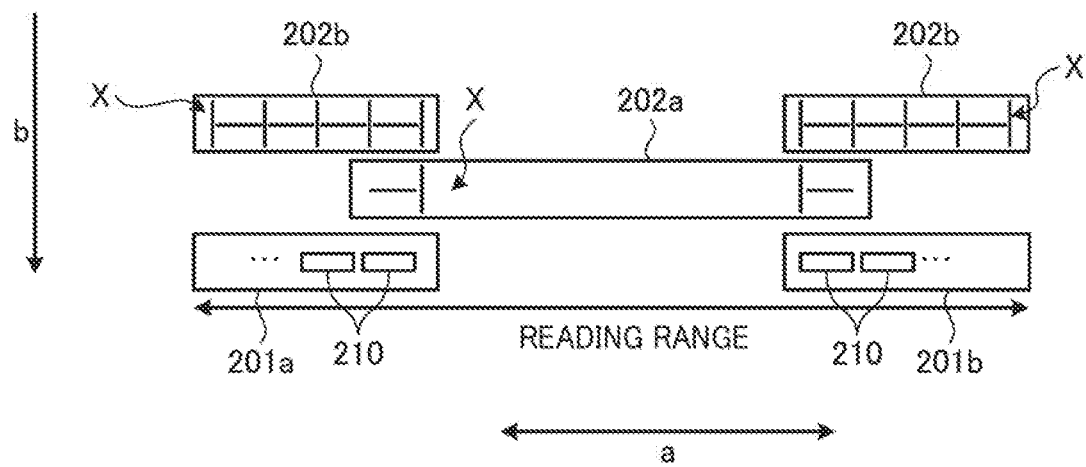
FIG. 4 is a diagram illustrating exemplary relative positions of the reading devices and the position reference members of the first embodiment.
Figure 5:
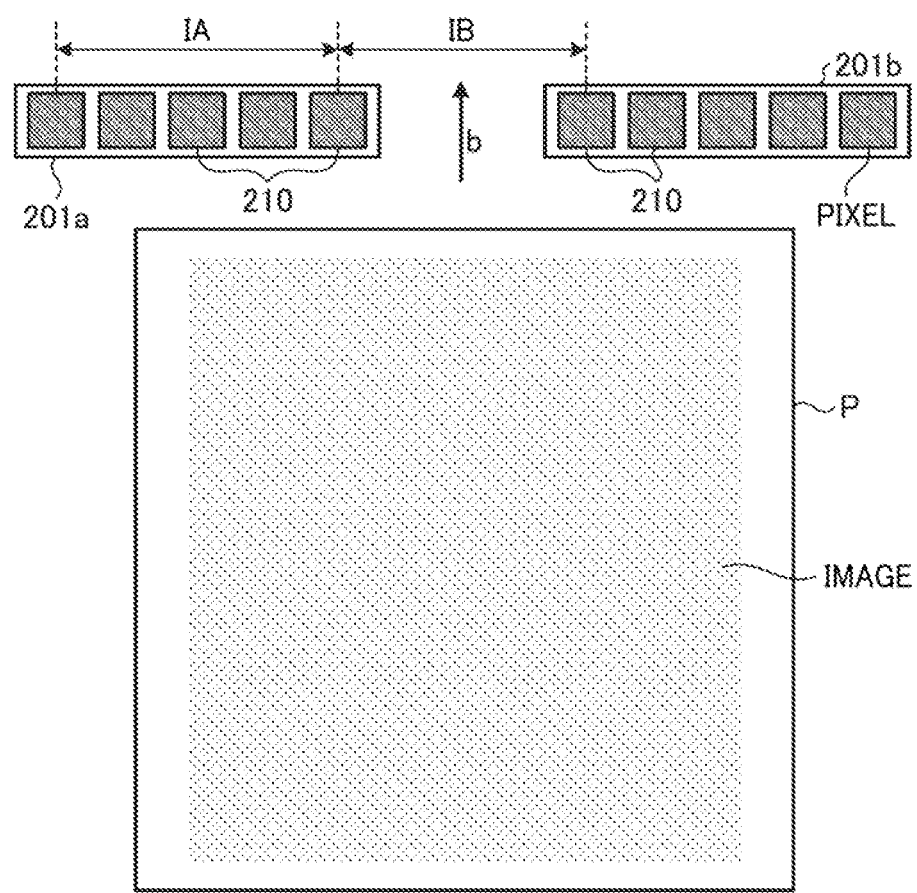
FIG. 5 is a diagram illustrating exemplary relative positions of the reading devices and a recording sheet of the first embodiment.

FIG. 4 is a diagram illustrating exemplary relative positions of the reading devices 201 and the position reference members 202. FIG. 5 is a diagram illustrating exemplary relative positions of the reading devices 201 and a recording sheet P. As illustrated in FIG. 4, in the present embodiment, the plurality of reading devices 201 (201a and 201b) are disposed along a main scanning direction a perpendicular to a sub-scanning direction b corresponding to the direction of transporting the recording sheet P. Herein, the recording sheet P included in the reading range has a wide width. As illustrated in FIG. 5, therefore, the plurality of reading devices 201 (201a and 201b) are disposed not over the entire width of the recording sheet P included in the reading range, but are disposed near opposite end portions of the recording sheet P.

The two types of position reference members 202 (202a and 202b) are disposed for the reading devices 201 (201a and 201b).

As illustrated in FIG. 4, the predetermined scales X are positioned on the position reference members 202 (202a and 202b). Each of the scales X on the position reference members 202 (202a and 202b) includes a horizontal line parallel to the main scanning direction a of the reading devices 201 and a vertical line perpendicular to the main scanning direction a of the reading devices 201.

As illustrated in FIG. 4, the vertical lines of the scales X are positioned at equal intervals on the position reference members 202 (202a and 202b) to correspond to the sensor chips 210 on the substrates of the reading devices 201 such that each of the sensor chips 210 reads the corresponding vertical line. The horizontal lines of the scales X are positioned between the vertical lines of the scales X.

As illustrated in FIG. 4, the vertical lines and the horizontal lines on the position reference members 202 (202a and 202b) are spaced from each other. With this configuration, even if a horizontal line is included in a reading area of one of the reading devices 201 when the reading device 201 is reading a vertical line, coordinates of the vertical line are successfully calculated.

The position reference member 202a functions as a reference for correcting the relative positions of the reading devices 201 (201a and 201b). The position reference member 202a is disposed such that one of the scales X thereof is positioned to correspond to one of the sensors chips 210 in one of the adjacent reading devices 201 and that the other scale X thereof is positioned to correspond to one of the sensors Chips 210 in the other one of the adjacent reading devices 201.

Each of the position reference members 202b functions as a reference for correcting the relative positions of the pixels in the corresponding reading device 201. Each of the position reference members 202b is disposed such that the scales X thereof are positioned to correspond to all sensors chips 210 in the corresponding reading device 201.

The scale X on one end portion of the position reference member 202a and the scale X on one end portion of one of the position reference members 202b adjacent to the one end portion of the position reference member 202a are positioned in the reading area of the same sensor chip 210.

Relative positions of the reading devices 201 and the recording sheet P will now be described.

In FIG. 5, an interval IA represents a relative distance between the outermost ones of the sensor chips 210 (i.e., pixels) in the reading device 201 (201a), and an interval IB represents a relative distance between the reading devices 201 (201a and 201b). If the values of the intervals IA and IB are known, the reading devices 201 (201a and 201b) are disposed to correspond to the opposite end positions of the recording sheet P, as illustrated in FIG. 5, to enable accurate detection of the positions of the end positions of the transported recording sheet P and the position of the image recorded on the recording sheet P.

The disposition of the reading devices 201 (201a and 201b) illustrated in FIG. 5 is an ideal one. In reality, however, the reading devices 201 (201a and 201b) have various manufacturing variations or installation variations.

FIGS. 6A to 6E are diagrams illustrating examples of deviation in relative position of the reading devices 201 (201a and 201b).

Figure 6A:
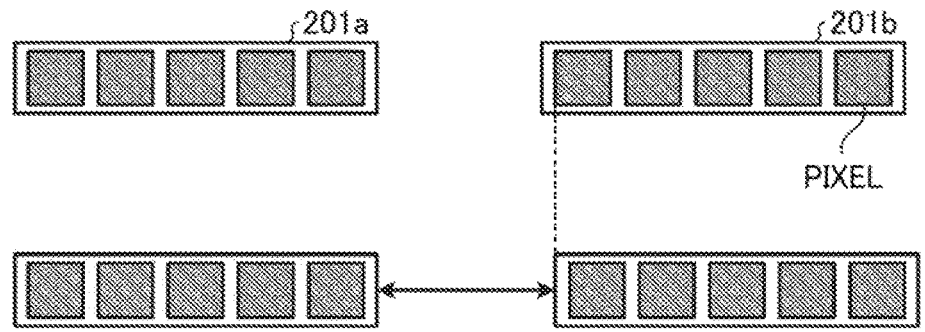
FIGS. 6A to 6E are diagrams illustrating examples of deviation in relative position of the reading devices of the first embodiment.

FIG. 6A illustrates a deviation in position in the main scanning direction between the reading devices 201 (201a and 201b). Such a deviation in position is caused by installation variations of the reading devices 201 (201a and 201b).

Figure 6B:
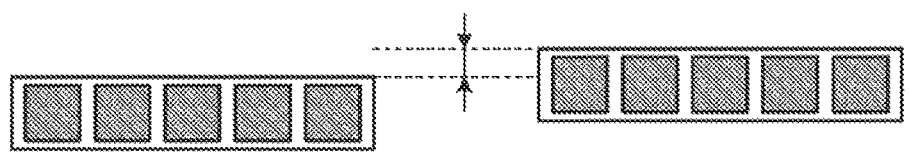

FIG. 6B illustrates a deviation in position in the sub-scanning direction between the reading devices 201 (201a and 201b). Such a deviation in position is caused by installation variations of the reading devices 201 (201a and 201b).

Figure 6C:
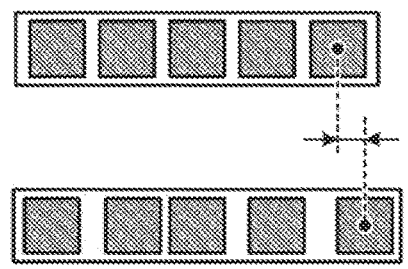

FIG. 6C illustrates a deviation in position in the main scanning direction in one of the reading devices 201 (201a and 201b). Such a deviation in position is caused by manufacturing variations of the reading devices 201 (201a and 201b) or temperature change over time.

Figure 6D:
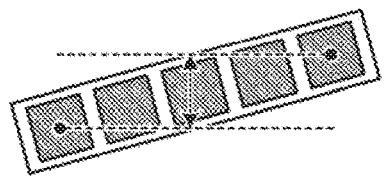

FIG. 6D illustrates a deviation in position in the sub-scanning direction in one of the reading devices 201 (201a and 201b). Such a deviation in position is caused by installation variations of the reading devices 201 (201a and 201b).

Figure 6E:
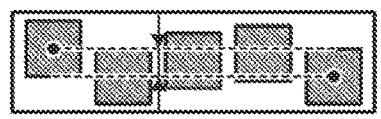

FIG. 6E illustrates another deviation in position in the sub-scanning direction in one of the reading devices 201 (201a and 201b). Such a deviation in position is caused by manufacturing variations of the reading devices 201 (201a and 201b).

Without correction of deviations in position such as those illustrated in FIGS. 6A to 6E, it is difficult for the reading devices 201 (201a and 201b) to accurately detect the positions of the end portions of the recording sheet P and the position of the image recorded on the recording sheet P.

In the present embodiment, therefore, deviations in position such as those illustrated in FIGS. 6A to 6E are corrected to accurately detect the positions of the end portions of the recording sheet P and the position of the image recorded on the recording sheet P.

A description will now be given of a functional configuration of the printing system 1, specifically, functions implemented through execution of a program stored in a storage device such as the HDD 18 or the ROM 12a by the CPU 11 of the printing system 1. The following description will be given of a function of correcting the deviation in position of the reading devices 201 (201a and 201b) as one of the functions of the printing system 1 of the present embodiment, and description of generally known functions of the printing system 1 will be omitted.

Figure 7:
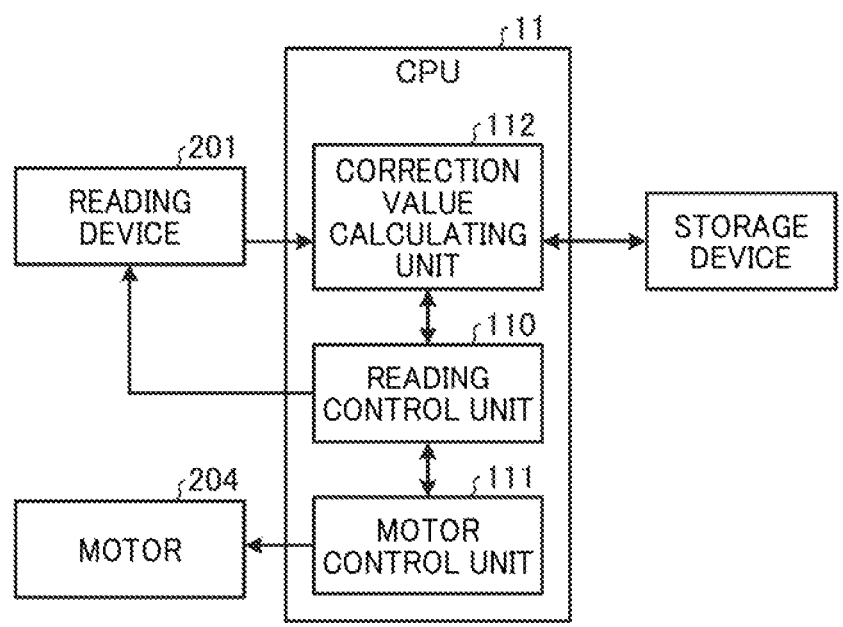
FIG. 7 is a functional block diagram illustrating a functional configuration of the printing system of the first embodiment.

FIG. 7 is a functional block diagram illustrating a functional configuration of the printing system 1. As illustrated in FIG. 7, the CPU 11 of the printing system 1 functions as a reading control unit 110, a motor control unit 111, and a correction value calculating unit 112.

In the present embodiment, the above-described function of the printing system 1 is implemented through the execution of the program by the CPU 11. However, the implementation of the function is not limited thereto. For example, the functions of the reading control unit 110, the motor control unit 111, and the correction value calculating unit 112 may be partially or entirely implemented by a dedicated hardware circuit.

The motor control unit 111 outputs a drive signal to the motor 204 to drive the rotary member 203 to rotate. The motor control unit 111 further outputs a drive stop signal to the motor 204 to stop the rotation of the rotary member 203.

The reading control unit 110 outputs a read start signal to the reading devices 201 (201a and 201b) to start reading with the reading devices 201 (201a and 201b). Further, in response to a read signal from the reading devices 201 (201a and 201b), the reading control unit 110 outputs a read end signal to the reading devices 201 (201a and 201b) to complete the reading with the reading devices 201 (201a and 201b).

The correction value calculating unit 112 (i.e., circuitry) controls the motor control unit 111 and the reading control unit 110, and calculates correction values for the deviation in position between the reading devices 201 (201a and 201b) and the deviation in position in the reading devices 201 (201a and 201b). More specifically, the correction value calculating unit 112 controls the motor control unit 111 to position the position reference members 202 (202a and 202b) to face the reading devices 201 (201a and 201b), and controls the reading control unit 110 to execute reading with the reading devices 201 (201a and 201b). Further, the correction value calculating unit 112 calculates the correction values and stores the calculated correction values in a storage device such as the HDD 18 or the RAM 12b.

When detecting the positions of the end portions of the transported recording sheet P or the position of the image recorded on the recording sheet P, the reading background 205 is positioned to face the reading devices 201 (201a and 201b) under the control of the motor control unit 111. In this state, the CPU 11 of the printing system 1 reads the positions of the end portions of the transported recording sheet P or the position of the image recorded on the recording sheet P with the reading devices 201 (201a and 201b), and corrects the result of reading based on the correction values stored in a storage device such as the HDD 18 or the RAM 12b, i.e., the correction values for the deviation in position between the reading devices 201 (201a and 201b) and the deviation in position in the reading devices 201 (201a and 201b).

The calculation of the correction values by the correction value calculating unit 112 will now be described.

The correction of the deviation in position in the main scanning direction between the reading devices 201 (201a and 201b) will first be described.

Figure 8A:
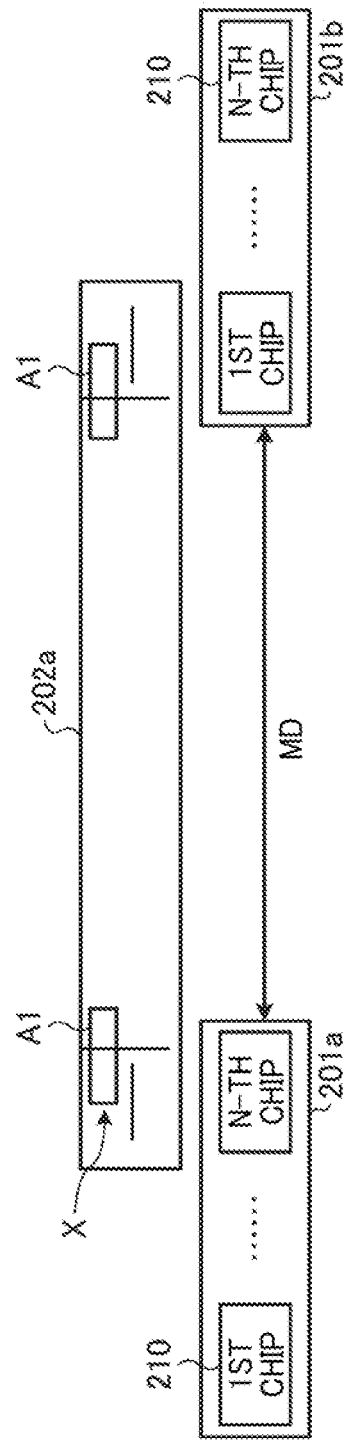
FIGS. 8A and 8B are diagrams illustrating a method of calculating a correction value for a deviation in position in a main scanning direction between the reading devices of the first embodiment.
Figure 8B:
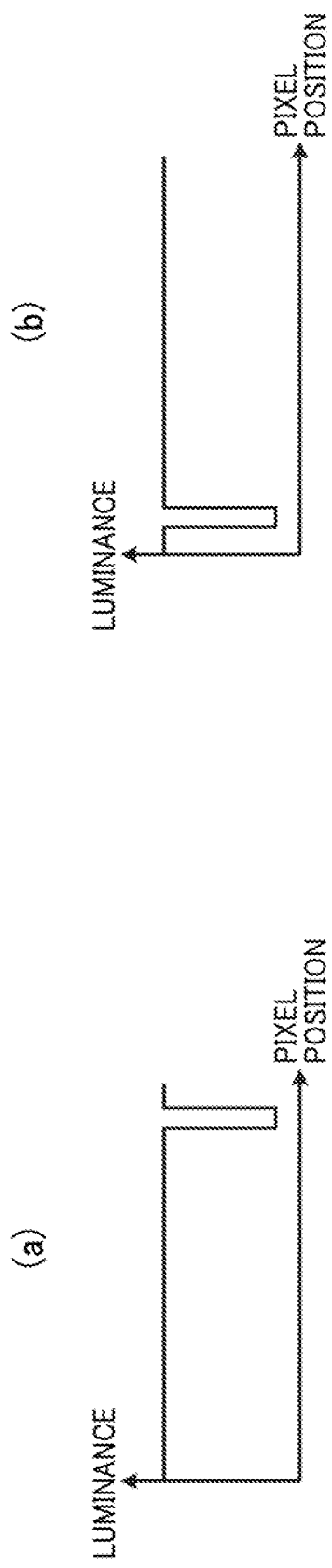

FIGS. 8A and 8B are diagrams illustrating a method of calculating the correction value for the deviation in position in the main scanning direction between the reading devices 201 (201a and 201b). As illustrated in FIG. 8A, the correction value calculating unit 112 first reads the vertical lines of the position reference member 202a with predetermined ones of the sensor chips 210 in the adjacent reading devices 201 (201a and 201b). In the position reference member 202a in FIG. 8A, each of frames Al represents the reading area of the corresponding sensor chip 210.

As illustrated in FIG. 8B, the correction value calculating unit 112 identifies, from the reading result, which ones of the pixels in the sensor chips 210 corresponds to the vertical lines of the position reference member 202a. In FIG. 8B, dips in graphs (a) and (b) correspond to the vertical lines of the position reference member 202a.

Based on the above-described result, the correction value calculating unit 112 accurately calculates the distance in the main scanning direction between the reading devices 201 (201a and 201b), i.e., a distance MD in FIG. 8A, and calculates the deviation of the reading devices 201 (201a and 201b) from the ideal position as the correction value.

The correction of the deviation in position in the sub-scanning direction between the reading devices 201 (201a and 201b) will be described.

Figure 9A:
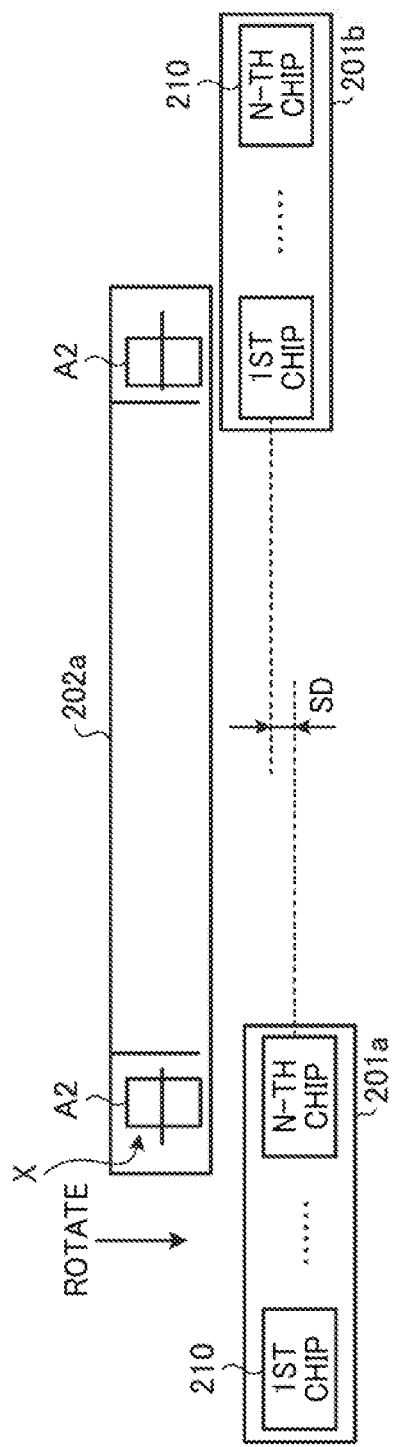
FIGS. 9A and 9B are diagrams illustrating a method of calculating a correction value for a deviation in position in a sub-scanning direction between the reading devices of the first embodiment.
Figure 9B:

FIGS. 9A and 9B are diagrams illustrating a method of calculating the correction value for the deviation in position in the sub-scanning direction between the reading devices 201 (201a and 201b). As illustrated in FIG. 9A, while moving the position reference member 202a at a constant speed in the sub-scanning direction with the rotation of the rotary member 203, the correction value calculating unit 112 reads the horizontal lines of the position reference member 202a with predetermined ones of the sensor chips 210 in the adjacent reading devices 201 (201a and 201b). In the position reference member 202a in FIG. 9A, each of frames A2 represents the reading area of the corresponding sensor chip 210.

As illustrated in FIG. 9B, the correction value calculating unit 112 identifies, from the reading result, which ones of read lines corresponds to the horizontal lines of the position reference member 202a. That is, the correction value calculating unit 112 identifies the positions in the sub-scanning direction of the horizontal lines of the position reference member 202a. In FIG. 9B, horizontal lines in graphs (c) and (d) correspond to the horizontal lines of the position reference member 202a.

Based on the above-described result, the correction value calculating unit 112 accurately calculates the distance in the sub-scanning direction between the reading devices 201 (201a and 201b), i.e., a deviation SD in FIG. 9A, and calculates the deviation of the reading devices 201 (201a and 201b) from the ideal position as the correction value. When the variations in position of the pixels in each of the sensor chips 210 are taken into account, the mean of the positions in the sub-scanning direction of the pixels may be calculated.

With the methods illustrated in FIGS. 8A to 9B, the correction values are calculated for the deviation in position in the main scanning direction between the adjacent reading devices 201 (201a and 201b) and the deviation in position in the sub-scanning direction between the reading devices 201 (201a and 201b).

In the calculation of the correction value for the deviation in position in the main scanning direction between the adjacent reading devices 201 (201a and 201b) or the deviation in position in the sub-scanning direction between the reading devices 201 (201a and 201b), the reading of the horizontal lines of the position reference member 202a may precede or follow the reading of the vertical lines of the position reference member 202a.

The correction of the deviation in position in the main scanning direction in the reading devices 201 (201a and 201b) will now be described.

Figure 10A:
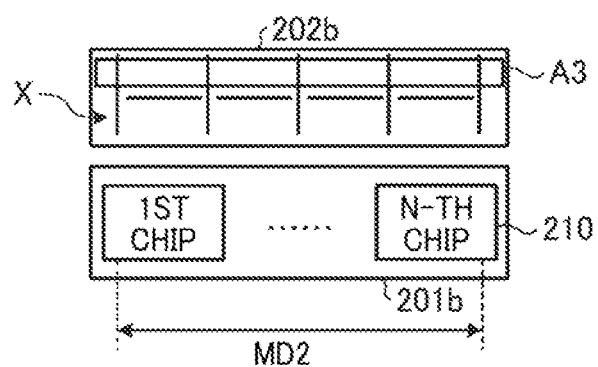
FIGS. 10A and 10B are diagrams illustrating a method of calculating a correction value for a deviation in position in the main scanning direction in each of the reading devices of the first embodiment.
Figure 10B:
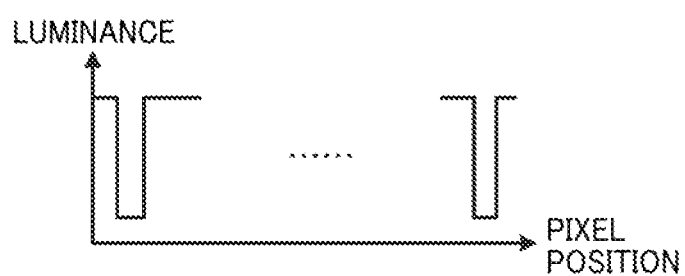

FIGS. 10A and 10B are diagrams illustrating a method of calculating the correction value for the deviation in position in the main scanning direction in the reading devices 201 (201a and 201b). As illustrated in FIG. 10A, the correction value calculating unit 112 first reads the vertical lines of the position reference members 202b corresponding to all sensor chips 210 in the reading devices 201 (201a and 201b). In the position reference member 202b in FIG. 10A, a frame A3 represents the reading area of all sensor chips 210 in the corresponding reading device 201 (201b).

As illustrated in FIG. 10B, the correction value calculating unit 112 identifies, from the reading result, which ones of the pixels in the sensor chips 210 of the reading device 201 (201b) correspond to the vertical lines of the position reference member 202b.

Based on the above-described reading result, the correction value calculating unit 112 accurately calculates the positions of the sensor chips 210 in each of the reading devices 201 (201a and 201b), i.e., a deviation MD2 in FIG. 10A, and calculates the deviation of the pixels in each of the reading devices 201 (201a and 201b) from the ideal position as the correction value.

The correction of the deviation in position in the sub-scanning direction in the reading devices 201 (201a and 201b) will be described.

Figure 11A:
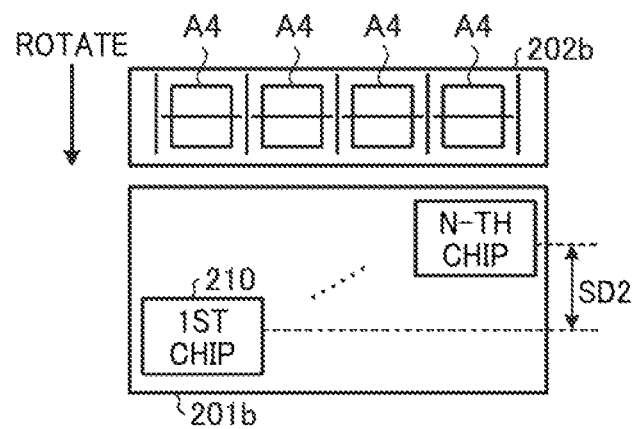
FIGS. 11A and 11B are diagrams illustrating a method of calculating a correction value for a deviation in position in the sub-scanning direction in each of the reading devices of the first embodiment.
Figure 11B:
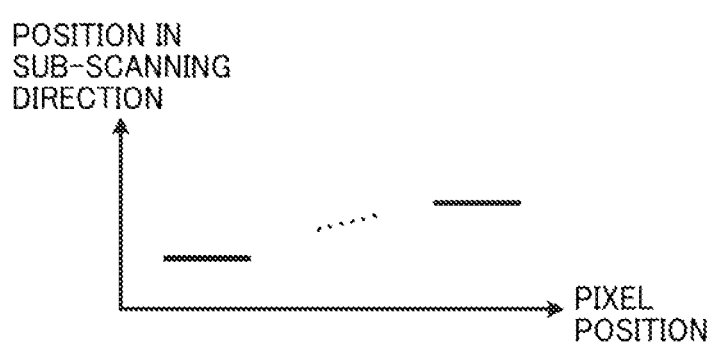

FIGS. 11A and 11B are diagrams illustrating a method of calculating the correction value for the deviation in position in the sub-scanning direction in the reading devices 201 (201a and 201b). As illustrated in FIG. 11A, while moving the position reference members 202b in the sub-scanning direction with the rotation of the rotary member 203, the correction value calculating unit 112 reads the horizontal lines of the position reference members 202b corresponding to all sensor chips 210 in the reading devices 201 (201a and 201b). In the position reference member 202b in FIG. 11A, frames A4 represent the respective reading areas of the sensor chips 210 in the corresponding reading device 201 (201b).

As illustrated in FIG. 11B, the correction value calculating unit 112 identifies, from the reading result, which ones of read lines of the reading device 201 (201b) correspond to the horizontal lines of the position reference member 202b. That is, the correction value calculating unit 112 identifies the positions in the sub-scanning direction of the horizontal lines of the position reference member 202b.

Based on the above-described reading result, the correction value calculating unit 112 accurately calculates the distance in the sub-scanning direction between the pixels in each of the reading devices 201 (201a and 201b), i.e., a deviation SD2 in FIG. 11A. Further, when the position of a given one of the sensor chips 210 is set as the reference position, the correction value calculating unit 112 calculates the deviation of one of the sensor chips 210 from the reference position as the correction value. When the variations in position of the pixels in each of the sensor chips 210 are taken into account, the mean of the positions in the sub-scanning direction of the pixels may be calculated.

With the methods illustrated in FIGS. 10A to 11B, the correction values are calculated for the deviation in position in the main scanning direction in the reading devices 201 (201a and 201b) and the deviation in position in the sub-scanning direction in the reading devices 201 (201a and 201b).

In the calculation of the correction value for the deviation in position in the main scanning direction in the reading devices 201 (201a and 201b) or the deviation in position in the sub-scanning direction in the reading devices 201 (201a and 201b), the reading of the horizontal lines of each of the position reference members 202b may precede or follow the reading of the vertical lines of the position reference member 202b.

The method of calculating the relative positions in the main scanning direction of the reading devices 201 (201a and 201b) will be described in detail.

Figure 12B:
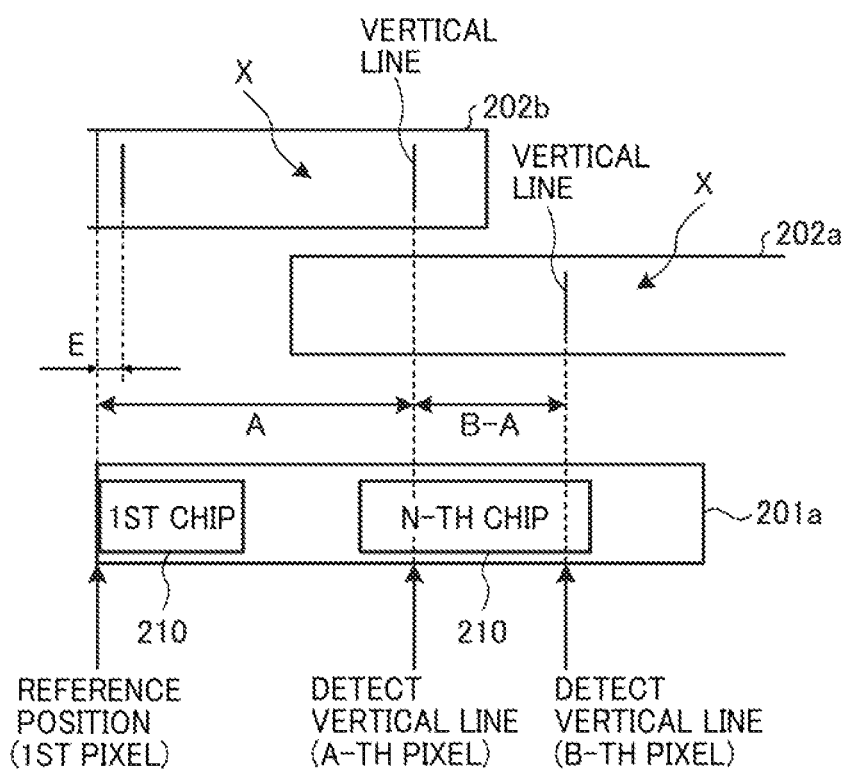

FIGS. 12A and 12B are diagrams illustrating a method of calculating the relative positions in the main scanning direction of the reading devices 201 (201a and 201b). For example, a description will be given of a method of calculating the distance from the first pixel in the reading device 201a to the vertical line in the N-th sensor chip 210 of the reading device 201b in FIG. 12A. It is assumed here that the distance between adjacent two of the vertical lines in the reading devices 201 (201a and 201b) is known.

A description will first be given of a method of calculating the distance from the first pixel (i.e., a reference pixel) in the first sensor chip 210 of the reading device 201a to the vertical line of the left position reference member 202b detected by the first sensor chip 210 of the reading device 201a and the distance between adjacent vertical lines of different position reference members 202 (202a and 202b).

The distance is calculated based on the number of pixels before the detected vertical line and the resolution. That is, as illustrated in FIG. 12B, a distance E from the first pixel (i.e., the reference pixel) in the first sensor chip 210 of the reading device 201a to the vertical line detected by the first sensor chip 210 of the reading device 201a is calculated as (the number of pixels before the detected vertical line)×(the resolution).

As illustrated in FIG. 12B, a distance B-A between adjacent vertical lines of different position reference members 202 (202a and 202b) detected by the same sensor chip 210 is calculated as (the difference between the number of pixels before the detected vertical line of the position reference member 202a and the number of pixels before the detected vertical line of the position reference member 202b)×(the resolution).

With the above-described calculation method, the correction value calculating unit 112 calculates a distance C in FIG. 12A, i.e., the distance from the first pixel in the reading device 201a to the vertical line in the N-th sensor chip 210 of the reading device 201b. The distance C is calculated as (the distance from the first pixel in the reading device 201a to the vertical line detected by the first sensor chip 210 of the reading device 201a)+(a known distance D2)+(the distance from the vertical line of the left position reference member 202b detected by the N-th sensor chip 210 of the reading device 201a to the vertical line of the position reference member 202a detected by the N-th sensor chip 210 of the reading device 201a)+(a known distance D1)+(the distance from the vertical line of the position reference member 202a detected by the first sensor chip 210 of the reading device 201b to the vertical line of the right position reference member 202b detected by the first sensor chip 210 of the reading device 201b)+(a known distance D3).

Correction of tilt of the position reference member 202a between the reading devices 201 (201a and 210b) will now be described.

Figure 13A:
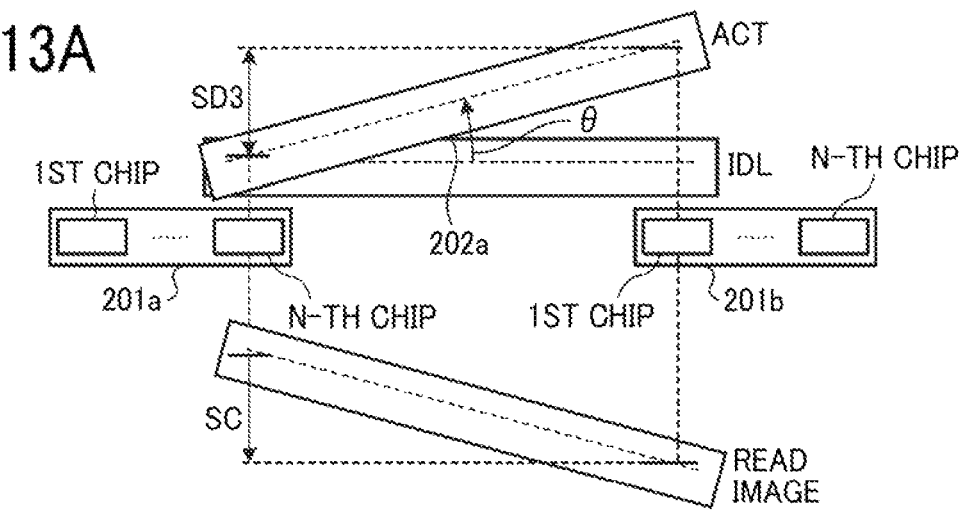
FIGS. 13A to 13C are diagrams illustrating correction of tilt of a position reference member between the reading devices of the first embodiment.
Figure 13B:
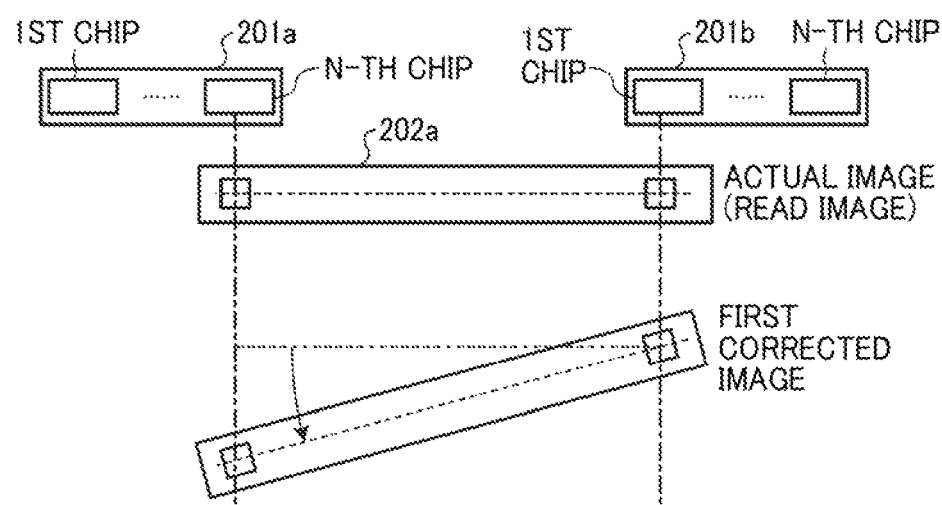
Figure 13C:
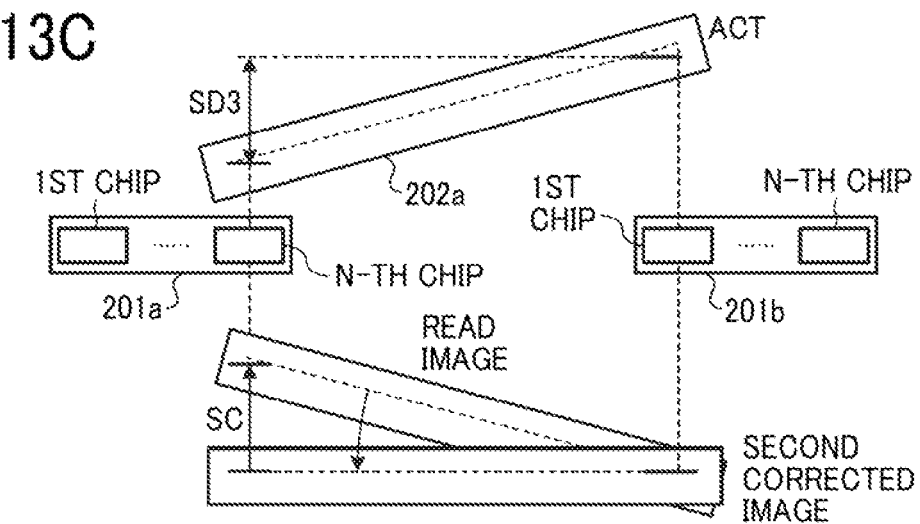

FIGS. 13A to 13C are diagrams illustrating correction of tilt of the position reference member 202a between the reading devices 201 (201a and 210b). In the foregoing examples of FIGS. 8A to 9B, the correction is executed on the assumption that there is no tilt of the position reference member 202a between the reading devices 201 (201a and 210b). In reality, however, tilt of the position reference member 202a may be expected to occur between the reading devices 201 (201a and 210b) owing to a factor such as a mechanical installation error. In this case, even if the deviation in position between the reading devices 201 (201a and 201b) is corrected, deviation in position in the sub-scanning direction due to the tilt of the position reference member 202a is left uncorrected as an error.

If the tilt of the position reference member 202a between the reading devices 201 (201a and 201b) is small, the amount of deviation of the position reference member 202a in the main scanning direction is considered to be substantially small as compared with that in the sub-scanning direction. The following description will therefore focus on a method of correcting the error in the sub-scanning direction of the position reference member 202a between the reading devices 201 (201a and 201b).

As illustrated in FIG. 13A, the correction value calculating unit 112 first calculates a correction value SC for a deviation SD3 in the sub-scanning direction with the method described above with FIGS. 9A to 9B. In FIG. 13A, ACT and IDL represent the actual installation direction and the ideal installation direction, respectively, of the position reference member 202a.

Then, as illustrated in FIG. 13B, the correction value calculating unit 112 reads the recording sheet P (i.e., a measurement target) with the reading devices 201 (201a and 201b) based on the calculated correction value SC, and calculates the difference between a pre-correction reading result of the shape of the recording sheet P and a post-correction reading result of the shape of the recording sheet P. The correction value calculating unit 112 then calculates the tilt of the position reference member 202a between the reading devices 201 (201a and 201b) based on the thus-calculated difference.

Then, as illustrated in FIG. 13C, the correction value calculating unit 112 calculates again the correction value SC for the deviation SD3 in the sub-scanning direction with the method described above with FIGS. 9A and 9B. In this process, the correction value calculating unit 112 calculates the deviation SD3 in the sub-scanning direction after correcting the tilt of the position reference member 202a between the reading devices 201 (201a and 201b). Thereby, the tilt of the position reference member 202a between the reading devices 201 (201a and 201b) is cancelled. The deviation in position is thus cancelled with this process of correcting the tilt of the position reference member 202a (i.e., the first position reference member).

Correction of tilt of the position reference members 202b in the reading devices 201 will now be described.

Figure 14A:
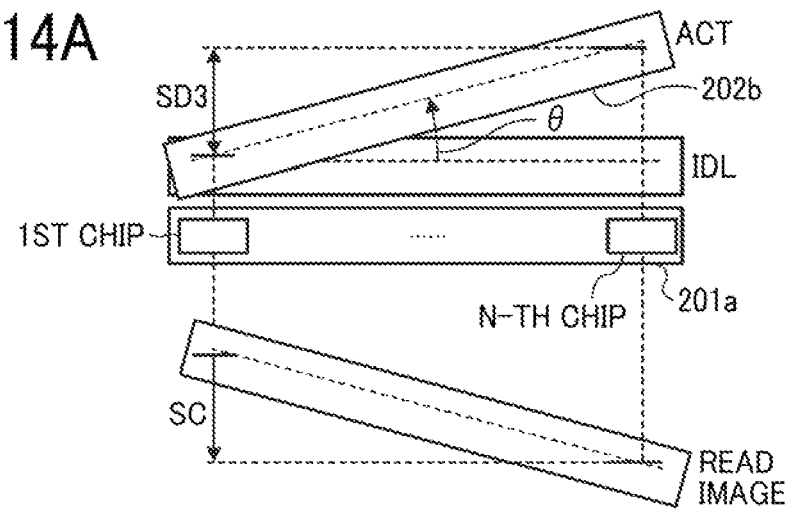
FIGS. 14A and 14C are diagrams illustrating correction of tilt of a position reference member in a reading device of the first embodiment.
Figure 14B:
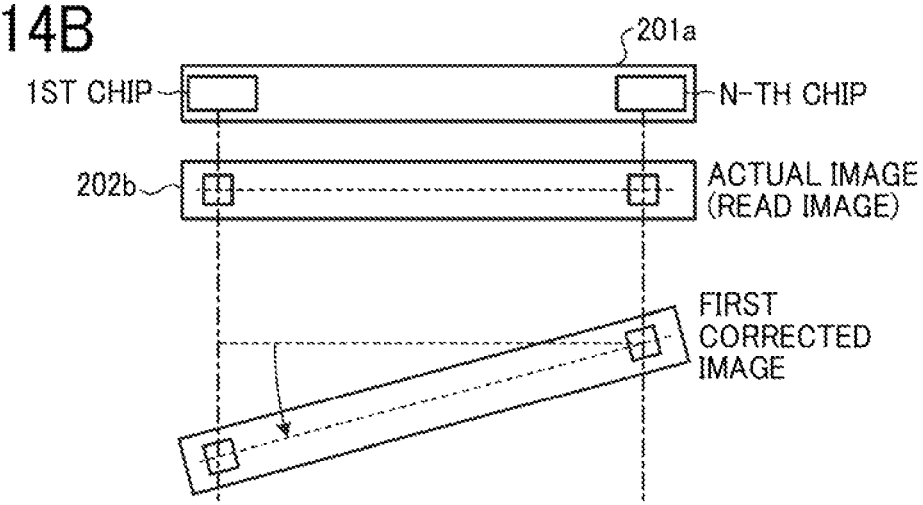

FIGS. 14A and 14B are diagrams illustrating correction of tilt of the position reference members 202b in the reading devices 201. In the foregoing examples of FIGS. 10A to 11B, the correction is executed on the assumption that there is no tilt of the position reference members 202b in the reading devices 201 (201a and 201b). In reality, however, tilt of the position reference members 202 (202b) may be expected to occur in the reading devices 201 (201a and 201b) owing to a factor such as a mechanical installation error. In this case, even if the deviation in position in the reading devices 201 (201a and 201b) is corrected, the deviation in position in the sub-scanning direction due to the tilt of the position reference members 202 (202b) is left uncorrected as an error.

If the tilt of the position reference members 202b in the reading devices 201 (201a and 201b) is small, the amount of deviation of the position reference members 202b in the main scanning direction is considered to be substantially small as compared with that in the sub-scanning direction. The following description will therefore focus on a method of correcting the error in the sub-scanning direction of the position reference members 202b in the reading devices 201 (201a and 201b).

As illustrated in FIG. 14A, the correction value calculating unit 112 first calculates the correction value SC for the deviation SD3 in the sub-scanning direction with the method described above with FIGS. 11A and 11B.

Then, as illustrated in FIG. 14B, the correction value calculating unit 112 reads the recording sheet P (i.e., a measurement target) with the reading devices 201 (201a and 201b) based on the calculated correction value SC, and calculates the difference between a pre-correction reading result of the shape of the recording sheet P and a post-correction reading result of the shape of the recording sheet P. The correction value calculating unit 112 then calculates the tilt of the position reference members 202b in the reading devices 201 (201a and 201b) based on the thus-calculated difference.

Figure 14C:
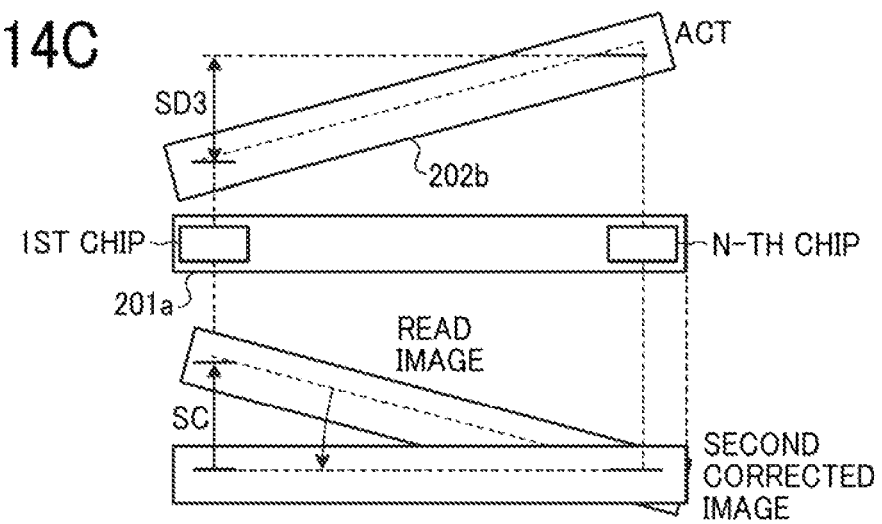

Then, as illustrated in FIG. 14C, the correction value calculating unit 112 calculates again the correction value SC for the deviation SD3 in the sub-scanning direction with the method described above with FIGS. 11A and 11B. In this process, the correction value calculating unit 112 calculates the deviation SD3 in the sub-scanning direction after correcting the tilt of the position reference members 202b in the reading devices 201 (201a and 201b). Thereby, the tilt of the position reference members 202b in the reading devices 201 (201a and 201b) is cancelled. The deviation in position is thus cancelled with this process of correcting the tilt of the position reference members 202b (i.e., the second position reference members).

A method of calculating the relative positions in the sub-scanning direction of the position reference members 202 (202a and 202b) will be described in detail.

Figure 15A:
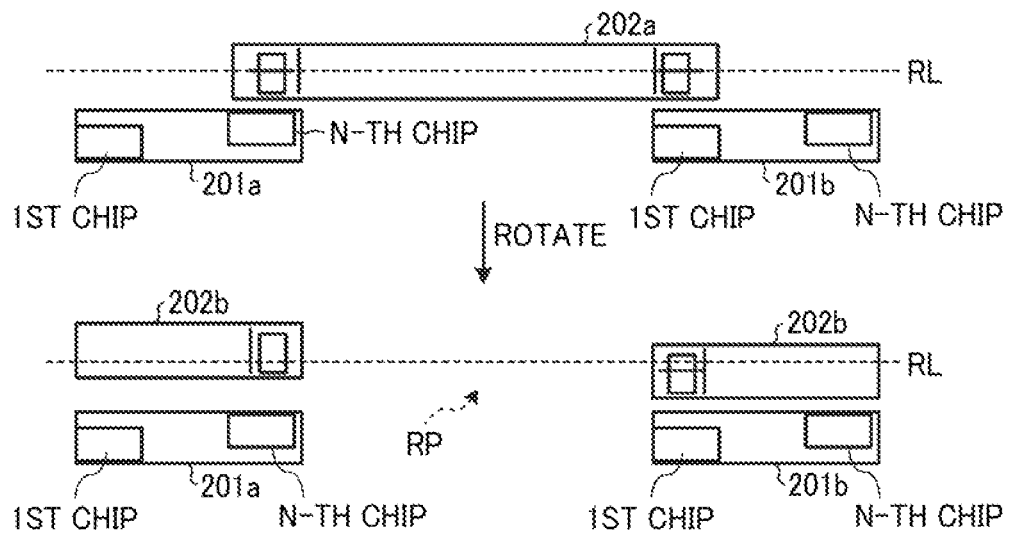
FIGS. 15A to 15B are diagrams illustrating a method of calculating relative positions in the sub-scanning direction of the position reference members of the first embodiment.
Figure 15B:
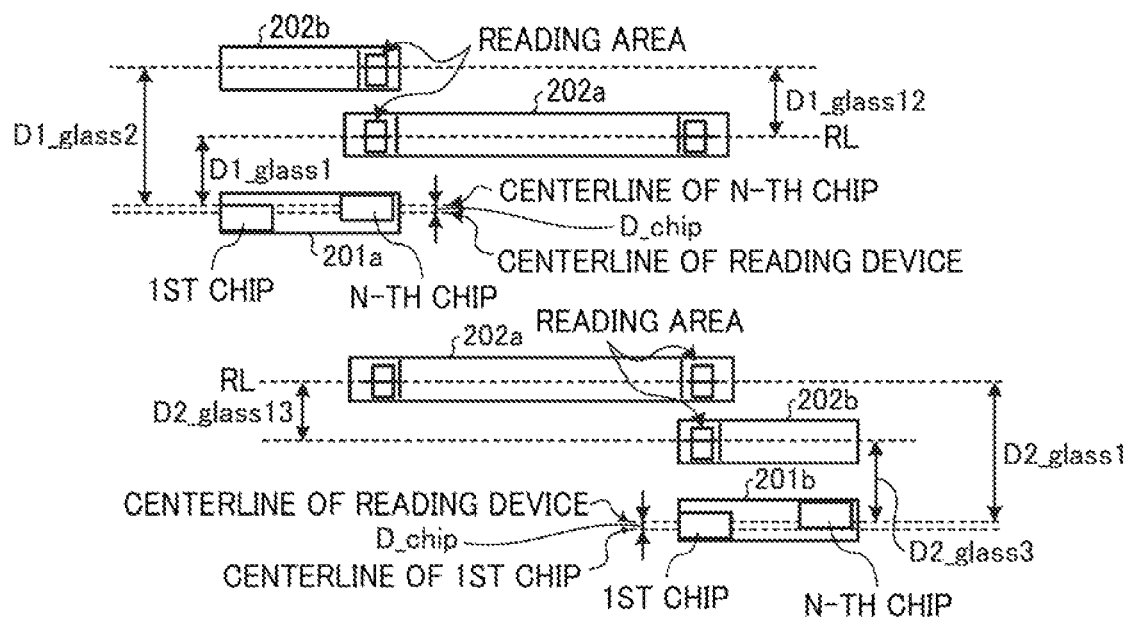

FIGS. 15A to 15C are diagrams illustrating a method of calculating the relative positions in the sub-scanning direction of the position reference members 202 (202a and 202b). As illustrated in FIG. 15A, when an installation position RP of the position reference member 202a is set as a reference, the two position reference members 202b may have a gap from the position reference member 202a in the sub-scanning direction (i.e., may be deviated from a reference line RL in the sub-scanning direction during the rotation of the rotary member 203) owing to a factor such as a mechanical installation error.

The following description of the present embodiment will be given of a method of calculating the relative positions of the two position reference members 202b with respect to the centerline in the sub-scanning direction of the position reference member 202a as the reference line.

As illustrated in FIG. 15B, D1_glass1 represents the deviation in position in the sub-scanning direction when the position reference member 202a faces the facing surface of the reading device 201a, and D1_glass2 represents the deviation in position in the sub-scanning direction when the position reference member 202b faces the facing surface of the reading device 201a. Similarly, as illustrated in FIG. 15C, D2_glass1 represents the deviation in position in the sub-scanning direction when the position reference member 202a faces the facing surface of the reading device 201b, and D2_glass3 represents the deviation in position in the sub-scanning direction when the position reference member 202b faces the facing surface of the reading device 201b.

When the gap in the sub-scanning direction between the position reference member 202a and the left position reference member 202b in FIG. 15B is represented as D1_glass12, the gap D1_glass12 is expressed as D1_glass2−D1_glass1.

Further, in FIG. 15C, a gap D2_glass13 in the sub-scanning direction between the position reference member 202a and the right position reference member 202b is similarly calculated. The positive and negative directions of the gaps D1_glass12 and D2_glass13 may be determined as desired.

With the gaps D1_glass12 and D2_glass13 detected, the gap between the two position reference members 202b is also detectable.

Further, as illustrated in FIGS. 15B and 15C, even if there is a variation D-chip in the sub-scanning direction between the sensor chips 210 in the reading devices 201 (201a and 201b), such a variation D-chip does not affect the calculation of the relative positions in the sub-scanning direction of the position reference members 202 (202a and 202b) of the present embodiment.

According to the above-described method, with the centerline in the sub-scanning direction of the position reference member 202a set as the reference line, the relative positions of the two position reference members 202b and the gap in the sub-scanning direction between the two position reference members 202b are calculated. Even if the actual installation position of the two position reference members 202b is deviated from the ideal installation position thereof in the sub-scanning direction, therefore, the correction is executed with the deviation taken into account.

A method of calculating tilt between the position reference members 202 (202a and 202b) will be described in detail.

Figure 16A:
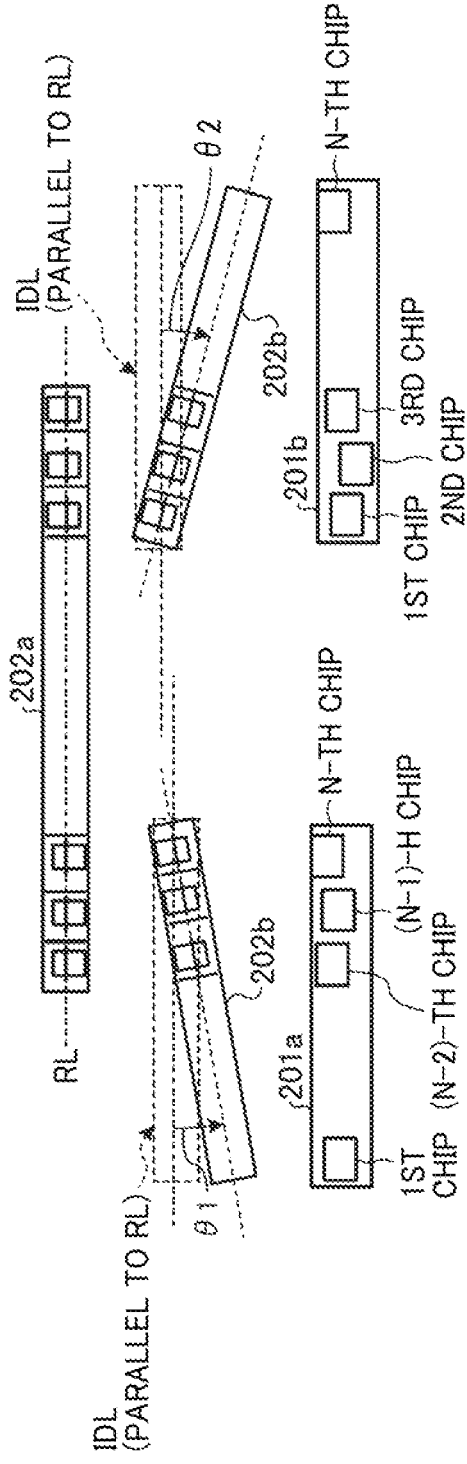
FIGS. 16A and 16B are diagrams illustrating a method of calculating tilt between position reference members of the first embodiment.
Figure 16B:
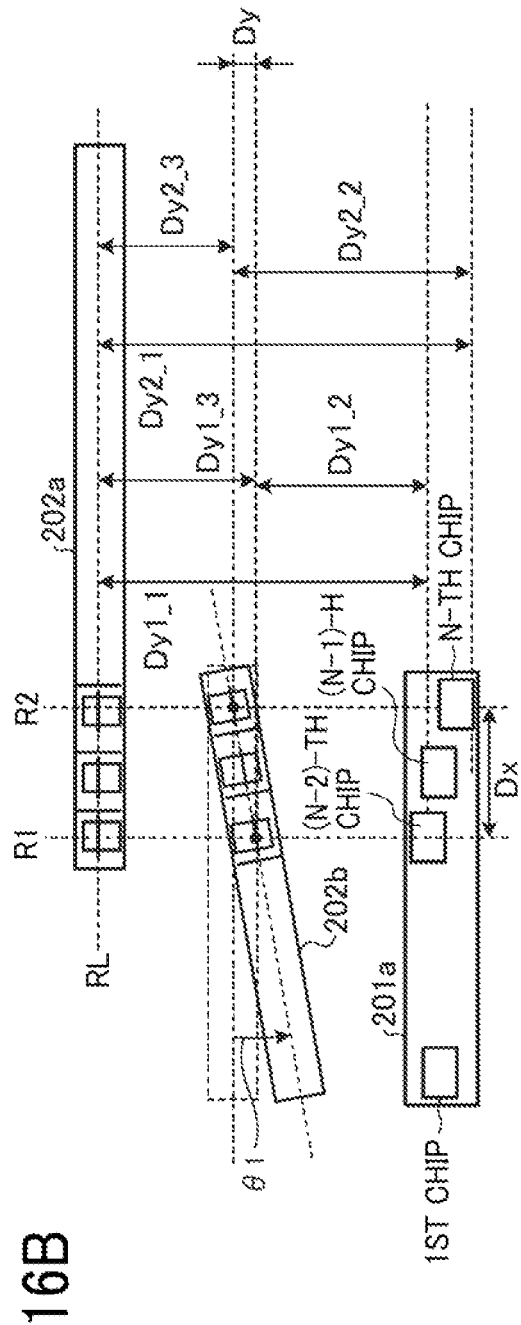

FIGS. 16A and 16B are diagrams illustrating a method of calculating tilt between the position reference members 202 (202a and 202b). As illustrated in FIG. 16A, the two position reference members 202b may have a gap in the sub-scanning direction from the reference line RL for installation (i.e., the line along the main scanning direction of the position reference member 202a) owing to a factor such as a mechanical installation error, as described above with FIGS. 15A to 15C. In addition, as illustrated in FIG. 16A, the left position reference member 202b and the right position reference member 202b in FIG. 16A may be tilted from the ideal installation direction IDL by tilt angles θ1 and θ2, respectively.

The following description of the present embodiment will be given of a method of calculating the tilt angles θ1 and θ2 relative to the ideal installation direction IDL to execute the correction in consideration of the tilt of the two position reference members 202b. The tilt angles θ1 and θ2 of the two position reference members 202b from the ideal installation direction IDL are independently calculable, and the following description will focus on a method of calculating the tilt angle θ1 of the left position reference member 202b in FIG. 16A.

Tilt correction is executed with at least two or more horizontal lines detectable by the reading device 201a at the same position in the main scanning direction of the position reference members 202a and 202b. In the present embodiment, tilt detection is executed with three horizontal lines, and the tilt angle θ1 is calculated with the N-th sensor chip 210 and the (N-2)-th sensor chip 210, as illustrated in FIG. 16B.

At the position of a reading area. R1 illustrated in FIG. 169 (i.e., the reading position of the (N-2)-th sensor chip 210 in the reading device 201a), a gap Dy1_3 in the sub-scanning direction of the position reference member 202b from the position reference member 202a is calculated. The gap Dy1_3 is calculated as Dy1_1−Dy1_2 with a method similar to that described above with FIGS. 15A to 15C.

At the position of a reading area R2 illustrated in FIG. 16B (i.e., the reading position of the N-th sensor chip 210 in the reading device 201a), a gap Dy2_3 in the sub-scanning direction of the position reference member 202b from the position reference member 202a is similarly calculated as Dy2_1−Dy2_2. Consequently, a gap Dy in the sub-scanning direction between the reading areas R1 and R2 is calculated as Dy2_3−Dy1_3. As described above with FIGS. 15A to 15C, the gap Dy is calculated without being affected by variations in the position in the sub-scanning direction between the sensor chips 210.

The calculation of the tilt angle θ1 also involves the distance in the main scanning direction between the reading areas R1 and R2. The distance in the main scanning direction between the reading areas R1 and R2 is calculated as (the distance between adjacent two of the sensor chips 210)×(the number of sensor chips 210 between the reading areas R1 and R2+1). Accordingly, the tilt angle θ1 is calculated as $\tan^{-1}(Dy/Dx)$ by trigonometric function.

The tilt from the ideal installation direction IDL is calculated with the above-described method. Even if the two position reference members 202b are deviated from the ideal installation direction IDL, therefore, the correction is executed in consideration of the deviation.

A procedure of processing executed by the printing system 1 will now be described.

Figure 17:
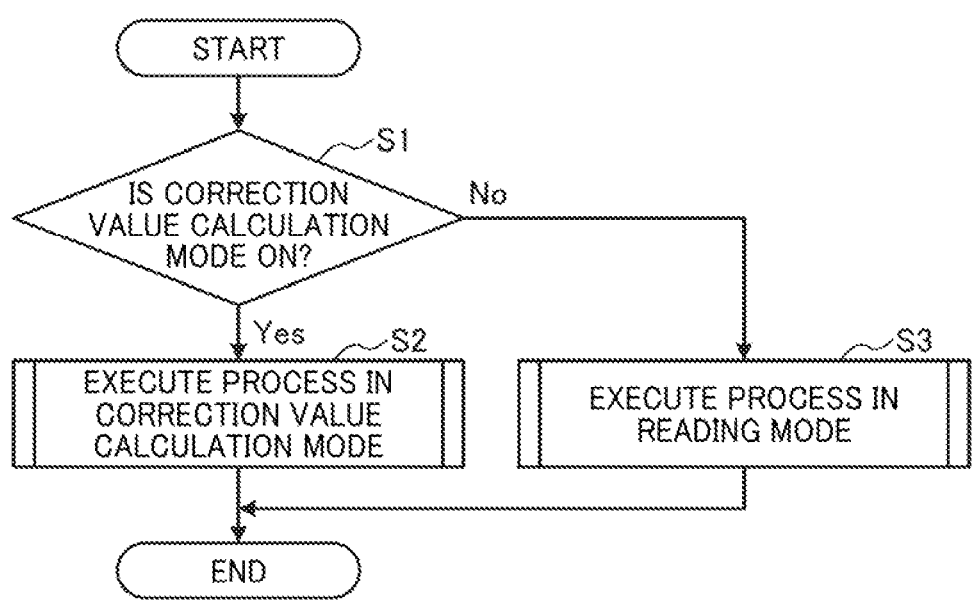
FIG. 17 is a flowchart schematically illustrating a procedure of processing executed by the printing system of the first embodiment.

FIG. 17 is a flowchart schematically illustrating a procedure of processing executed by the printing system 1. As illustrated in FIG. 17, the correction value calculating unit 112 first determines whether a correction value calculation mode is on (step S1).

If it is determined that the correction value calculation mode is on (Yes at step S1), the correction value calculating unit 112 executes a process in the correction value calculation mode to calculate the correction values with the position reference members 202 (202a and 202b) positioned facing the reading devices 201 (201a and 201b) (step S2). If it is determined that the correction value calculation mode is off (No at step S1), the correction value calculating unit 112 executes a process in a reading mode to read the recording sheet P with the reading background 205 positioned facing the reading devices 201 (201a and 201b) (step S3).

Figure 18:
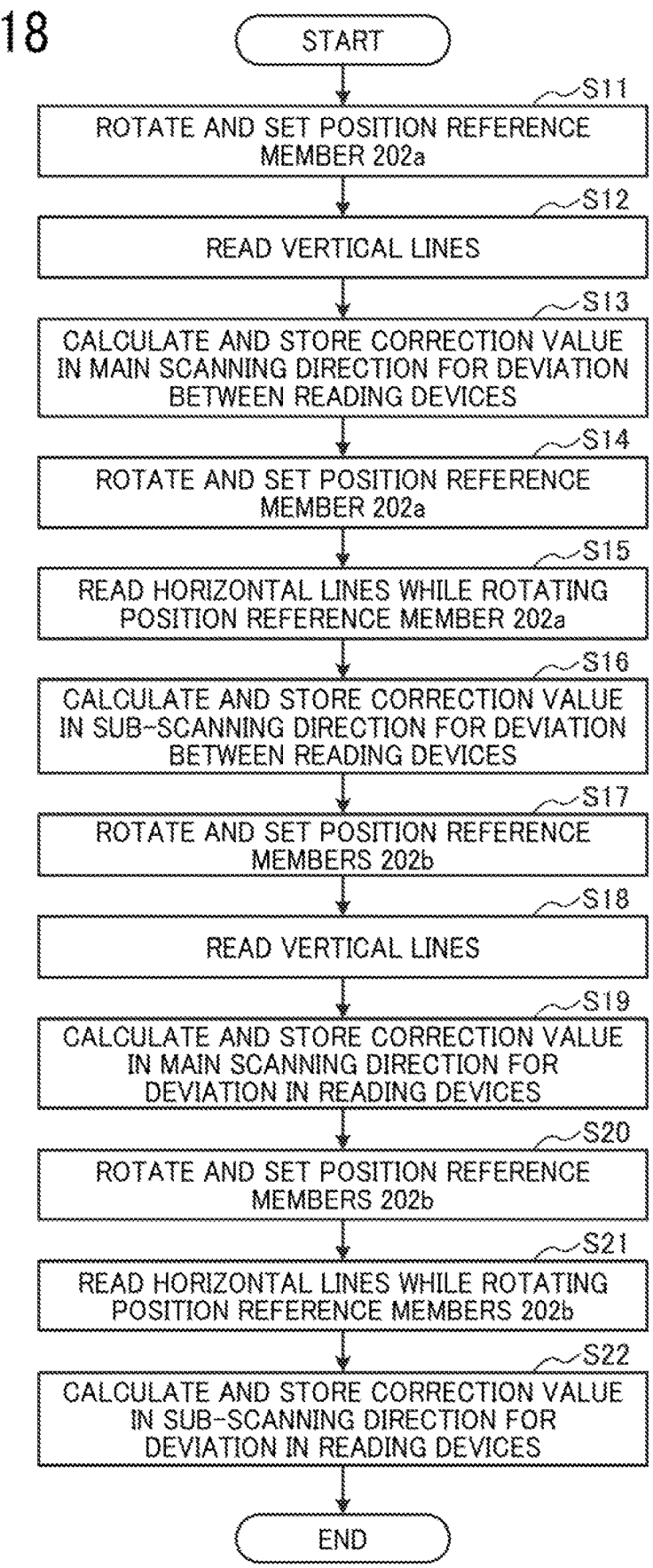
FIG. 18 is a flowchart schematically illustrating a procedure of a process executed in a correction value calculation mode in the first embodiment.

FIG. 18 is a flowchart schematically illustrating a procedure of the process in the correction value calculation mode. The process in the correction value calculation mode includes a correction value calculation process for the deviation in position between the reading devices 201 (201a and 201b) and a correction value calculation process for the deviation in position in the reading devices 201 (201a and 201b).

A description will first be given of the correction value calculation process in the correction value calculation mode for the deviation in position between the reading devices 201 (201a and 201b).

As illustrated in FIG. 18, the correction value calculating unit 112 first controls the motor control unit 111 to position the position reference member 202a to face the reading devices 201 (201a and 201b) (step S11).

The correction value calculating unit 112 then executes main scanning to read the vertical lines of the position reference member 202a (step S12). More specifically, the correction value calculating unit 112 controls the motor control unit 111 to position the position reference member 202a to face the reading devices 201 (201a and 201b), and controls the reading control unit 110 to read the vertical lines of the position reference member 202a with the reading devices 201 (201a and 201b).

Then, the correction value calculating unit 112 calculates the correction value for the deviation in position in the main scanning direction between the reading devices 201 (201a and 201b), and stores the calculated correction value in a storage device such as the HDD 18 under the corresponding calculation category (step S13).

The correction value calculating unit 112 then controls the motor control unit 111 to rotate the position reference member 202a to the position facing the reading devices 201 (201a and 201b) (step S14).

Then, the correction value calculating unit 112 executes sub-scanning to read the horizontal lines of the position reference member 202a (step S15). More specifically, the correction value calculating unit 112 controls the motor control unit ill to rotate the position reference member 202a, and controls the reading control unit 110 to read the horizontal lines of the position reference member 202a with the reading devices 201 (201a and 201b) during the rotation of the position reference member 202a.

Then, the correction value calculating unit 112 calculates the correction value for the deviation in position in the sub-scanning direction between the reading devices 201 (201a and 201b), and stores the calculated correction value in a storage device such as the HDD 18 under the corresponding calculation category (step S16).

A description will now be given of the correction value calculation process in the correction value calculation mode for the deviation in position in the reading devices 201 (201a and 201b).

As illustrated in FIG. 18, the correction value calculating unit 112 controls the motor control unit 111 to position the two position reference members 202b to face the reading devices 201 (201a and 201b) (step S17).

Then, the correction value calculating unit 112 executes main canning to read the vertical lines of the two position reference members 202b (step S18). More specifically, the correction value calculating unit 112 controls the motor control unit 111 to position the two position reference members 202b to face the reading devices 201 (201a and 201b), and controls the reading control unit 110 to read the vertical lines of the two position reference members 202b with the reading devices 201 (201a and 201b).

Then, the correction value calculating unit 112 calculates the correction value for the deviation in position in the main scanning direction in the reading devices 201 (201a and 201b), and stores the calculated correction value in a storage device such as the HDD 18 under the corresponding calculation category (step S19).

The correction value calculating unit 112 then controls the motor control unit 111 to rotate the two position reference members 202b to the position facing the reading devices 201 (201a and 201b) (step S20).

Then, the correction value calculating unit 112 executes sub-scanning to read the horizontal lines of the two position reference members 202b (step S21). More specifically, the correction value calculating unit 112 controls the motor control unit 111 to rotate the two position reference members 202b, and controls the reading control unit 110 to read the horizontal lines of the two position reference members 202b with the reading devices 201 (201a and 201b) during the rotation of the two position reference members 202b.

Then, the correction value calculating unit 112 calculates the correction value for the deviation in position in the sub-scanning direction in the reading devices 201 (201a and 201b), and stores the calculated correction value in a storage device such as the HDD 18 under the corresponding calculation category (step S22). Thereby, the correction value calculating unit 112 completes the process in the correction value calculation mode.

Figure 19:
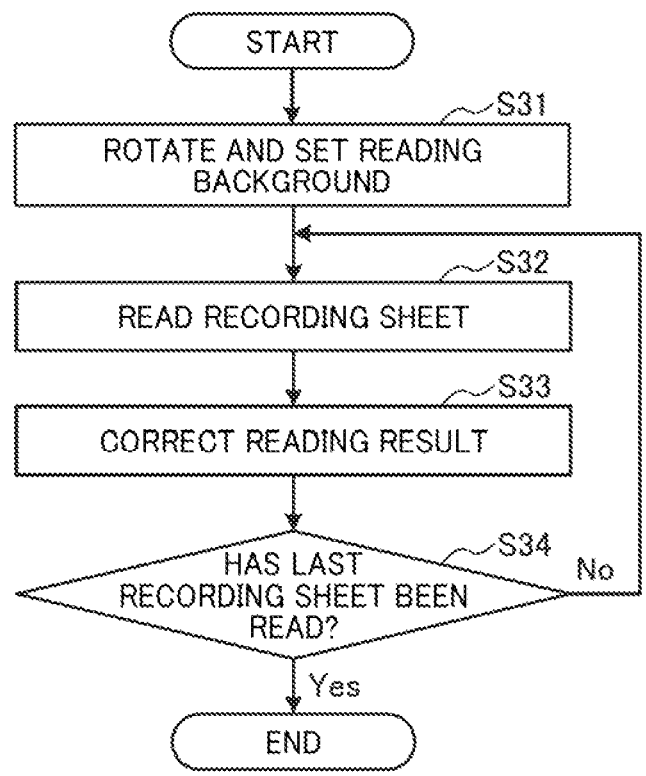
FIG. 19 is a flowchart schematically illustrating a procedure of a process executed in a reading mode in the first embodiment.

FIG. 19 is a flowchart schematically illustrating a procedure of the process in the reading mode. As illustrated in FIG. 19, in the reading mode, the correction value calculating unit 112 first controls the motor control unit 111 to position the reading background 205 to face the reading devices 201 (201a and 201b) (step S31).

Then, the correction value calculating unit 112 controls the reading control unit 110 to read the positions of the end portions of the transported recording sheet P or the position of the image recorded on the recording sheet P with the reading devices 201 (201a and 201b) (step S32).

The correction value calculating unit 112 then corrects the result of reading based on the correction values calculated in the correction value calculation mode (step S33).

The correction value calculating unit 112 repeats the processes of steps S32 and S33 on all recording sheets P to be processed.

If the correction value calculating unit 112 determines at step S34 that the last recording sheet P has been read (Yes at step S34), the process in the reading mode is completed.

As described above, according to the present embodiment, even if the reading range is increased, a similar level of accuracy to that of small-sized position reference members is obtained at low cost without an increase in length of position reference members.

Further, according to the present embodiment, the position reference member 202a (i.e., the first position reference member) for correcting the relative positions of the reading devices 201 and the position reference members 202b (i.e., the second position reference members) for correcting the relative positions of pixels in each of the reading devices 201 are assigned with different functions. Consequently, the hardware configuration and control are simplified, thereby providing an inexpensive configuration.

A second embodiment of the present invention will now be described.

The second embodiment is different from the first embodiment in including three or more reading devices 201.

The following description of the second embodiment will focus on differences from the first embodiment, and description of the same parts as those of the first embodiment will be omitted.

According to the first embodiment, when the number of reading devices 201 is n, the number of position reference members 202 for correcting the deviation in position in the reading devices 201 is n, and the number of position reference members 202 for correcting the deviation in position between the reading devices 201 is n-1. In this case, an increase in the number of reading devices 201 increases manufacturing costs.

In view of this, the second embodiment provides a configuration enabling the correction of the deviation in position with two position reference members 202 similarly as in the first embodiment even when n in the n reading devices 201 exceeds two (i.e., n>2).

Figure 20:
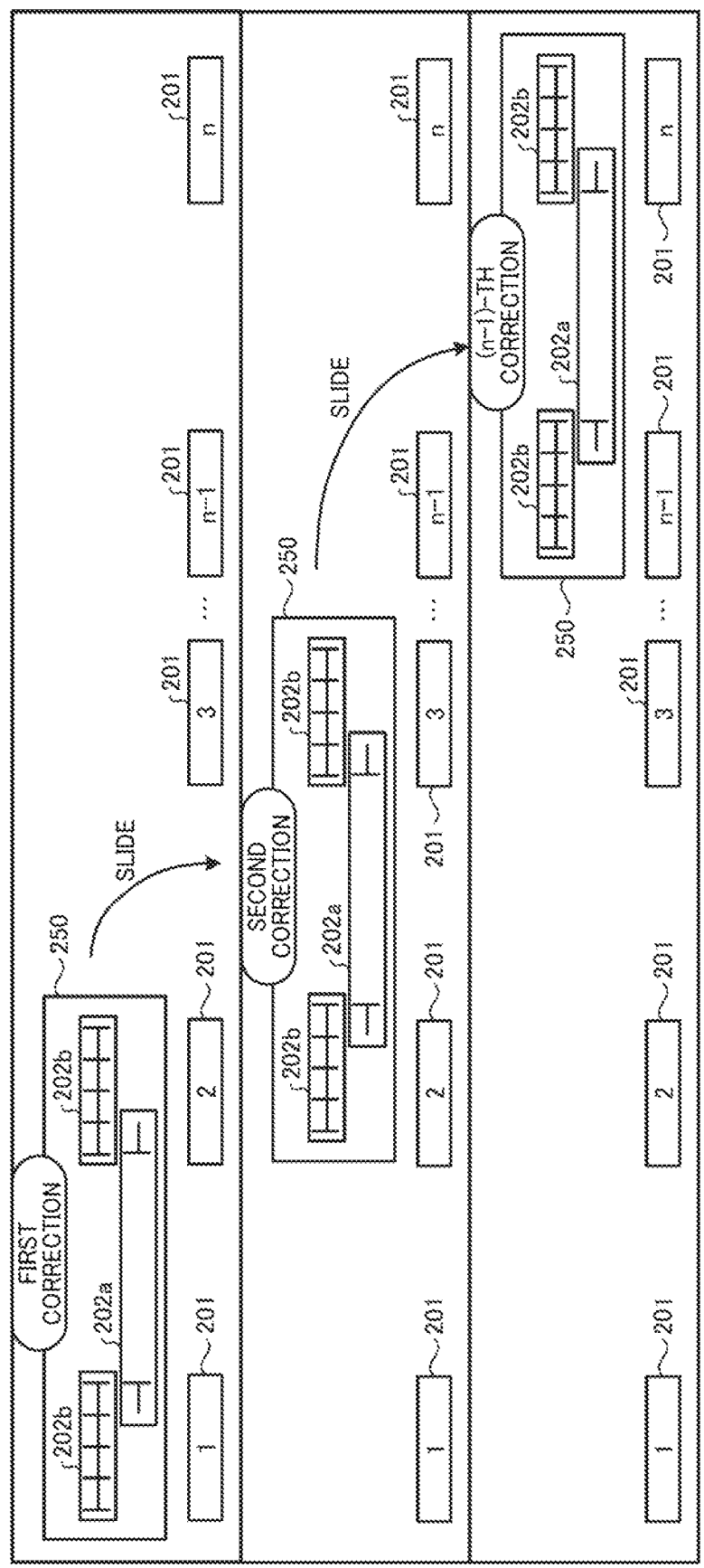
FIG. 20 is a diagram illustrating a correction value calculation method of a second embodiment of the present invention.

FIG. 20 is a diagram illustrating a correction value calculation method of the second embodiment. As illustrated in FIG. 20, n in the n reading devices 201 included in the printing system 1 of the second embodiment exceeds two (i.e., n>2). Further, the printing system 1 of the second embodiment includes a reference module 250 in which the position reference members 202. (202a and 202b) are modularized. More specifically, the reference module 250 includes one position reference member 202a and two position reference members 202b. In the reference module 250, the position reference members 202 (202a and 202b) are disposed to enable correction of the relative positions of adjacent two of the reading devices 201.

Further, in the printing system 1 of the second embodiment, the reference module 250 is configured to slide in the main scanning direction to enable correction of the relative positions of adjacent two of the reading devices 201.

With this configuration, the printing system 1 of the second embodiment calculates the correction values while sliding the reference module 250 in the main scanning direction.

More specifically, while causing the reference module 250 to slide in the main scanning direction, the correction value calculating unit 112 calculates the correction values and corrects the relative positions of adjacent two of the reading devices 201 the n-1 times.

As described above, according to the second embodiment, even if n in the n reading devices 201 exceeds two (i.e., n>2), the correction values are calculated with no need to increase the number of position reference members 202. Specifically, for the n reading devices 201, the n second position reference members and the (n-1) first position reference members are normally used. The second embodiment, however, enables the calculation of the correction values with two second position reference members and one first position reference member, and thus is cost-effective.

A third embodiment of the present invention will now be described.

The third embodiment is different from the first embodiment in that a scanner unit for use in a multifunction peripheral, printer, or product (MFP) is employed as a modified example of the detector 200.

The following description of the third embodiment will focus on differences from the first embodiment, and description of the same parts as those of the first embodiment will be omitted.

Figure 21:
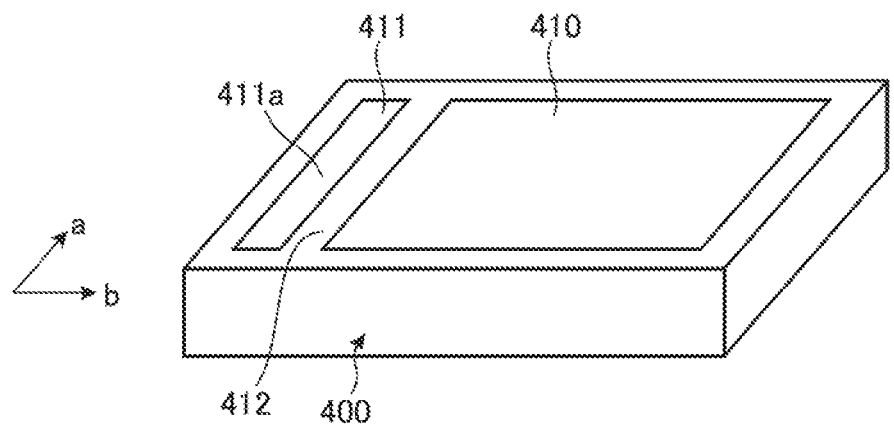
FIG. 21 is a perspective view illustrating an exterior of an image reading device of a third embodiment of the present invention.

FIG. 21 is a perspective view illustrating an exterior of an image reading device 400 of the third embodiment. The image reading device 400 is a modified example of the detector 200, and is a scanner unit for use in an MFP, for example.

As illustrated in FIG. 21, the image reading device 400 includes a contact glass 410 disposed on an upper surface thereof. The contact glass 410 is formed into a substantially rectangular shape. The image reading device 400 includes the reading devices 201 (see FIGS. 22A and 22B) that move in the sub-scanning direction b in the image reading device 400 and performs reading in lines in the main scanning direction a. The reading devices 201 read a document placed on the contact glass 410.

The image reading device 400 further has a slit 411, in which a glass 411a is fitted. The reading devices 201 read the position reference members 202 (see FIGS. 22A and 22B) through the slit 411. The image reading device 400 further includes a bridge 412 formed between the contact glass 410 and the slit 411.

In this configuration, a short side of the contact glass 410 and a long side of the slit 411 are adjacent to each other across the bridge 412, as illustrated in FIG. 21.

Figure 22A:
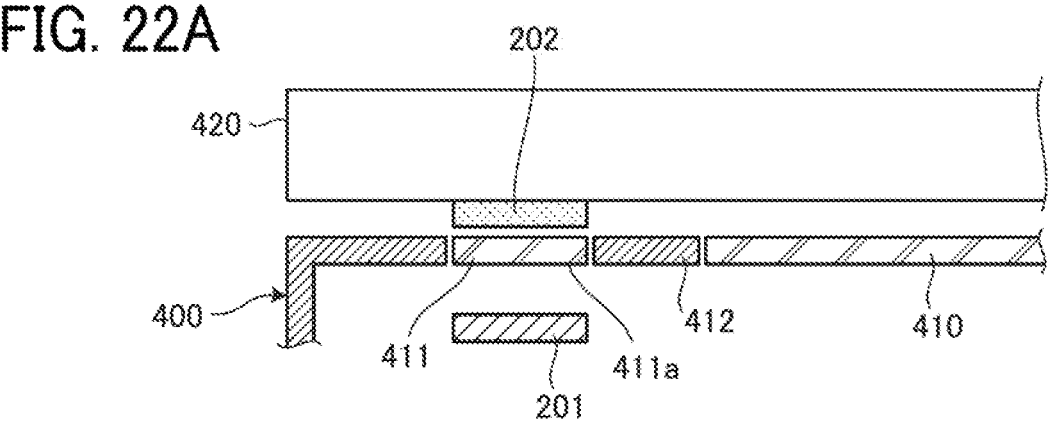
FIGS. 22A and 22B are partial side views of an internal structure of the image reading device of the third embodiment.
Figure 22B:
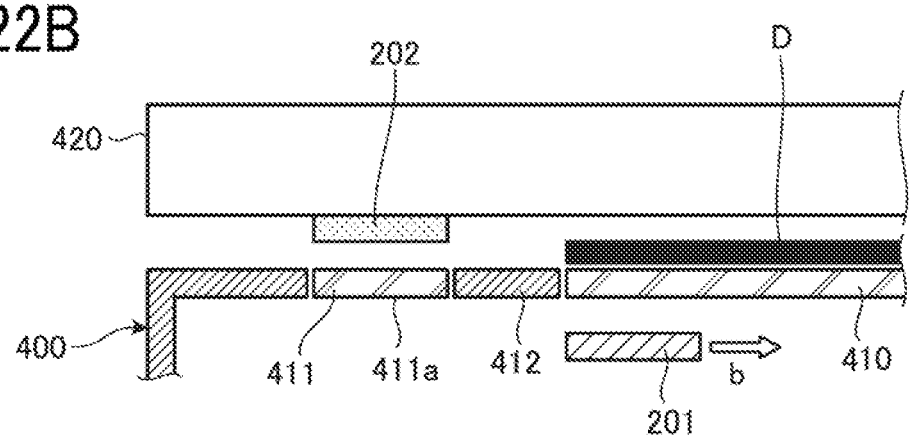

FIGS. 22A and 22B are partial side views of an internal structure of the image reading device 400. FIG. 22A illustrates a state in which the reading devices 201 are positioned under the slit 411, and FIG. 22B illustrates a state in which the reading devices 201 are positioned under the contact glass 410.

An automatic document feeder (ADF) 420 is disposed above the image reading device 400. The ADF 420 is opened and closed when a document is placed on the contact glass 410. FIGS. 22A and 22B illustrate the closed state of the ADF 420. As illustrated in FIGS. 22A and 22B, the ADF 420 has the position reference members 202 on a bottom surface thereof at a position facing the slit 411 in the closed state of the ADF 420.

In FIG. 22A, the reading devices 201 are positioned under the glass 411a fitted in the slit 411, and read the position reference members 202 through the glass 411a in the slit 411.

FIG. 22A illustrates the position reference members 202 formed on the bottom surface of the ADF 420 at the position facing the slit 411 in the closed state of the ADF 420, as described above. The position reference members 202, however, are not necessarily required to be disposed on the ADF 420, and may replace the glass 411a in the slit 411.

In FIG. 22B, the reading devices 201 positioned under the contact glass 410 read a document D placed on the contact glass 410, while moving in the sub-scanning direction b.

In this configuration, if the reading devices 201 are installed at an angle with respect to the position reference members 202, issues similar to those described above in the first embodiment arise. Such issues are addressed by methods similar to those of the first embodiment.

In the foregoing embodiments, the CIS forming a life-size optical system is employed as each of the reading devices 201. The reading device 201, however, is not limited thereto, and may be a reading device forming a reduction optical system, which is formed with components such as a light source, a plurality of reflecting members (e.g., mirrors), an image forming lens, and a linear image sensor. As long as the reading device 201 is a device capable of detecting the position of a reading target, the accuracy of position detection is improved.

In the above-described examples of the embodiments of the present invention, the image reading device and the image forming apparatus are applied to the printing system including the inkjet printer. However, the image reading device and the image forming apparatus are not limited thereto, and may be applied to a printing system including an electrophotographic printer.

Further, in the above-described examples of the embodiments of the present invention, the image reading device and the image forming apparatus are applied to the printing system including the printing apparatus such as a commercial printing apparatus (e.g., a production printing machine). However, the image reading device and the image forming apparatus are not limited thereto, and may be applied to an image forming apparatus such as a copier, a printer, a scanner, a facsimile machine, or an MFP having at least two of a copier function, a printer function, a scanner function, and a facsimile function.

Further, in the above-described examples of the embodiments of the present invention, the image reading device is applied to the position detection in the field of image formation. However, the image reading device is not limited thereto, and may be applied to position detection in a variety of fields such, as product inspection in the factory automation (FA) field, for example.

The image reading device is also applicable to a banknote reading device that determines whether a banknote is printed in the correct shape at the correct position to identify the banknote or prevent banknote forgery.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

What is claimed is:

1. An image reading device comprising:
    a plurality of reading devices arranged in a main scanning direction perpendicular to a sub-scanning direction in which a reading target is transported;
    a plurality of position reference members each including a reference pattern as a reference for correcting relative positions of a plurality of pixels in each of the plurality of reading devices or relative positions of the plurality of reading devices,
    the plurality of position reference members partially overlapping the plurality of reading devices, and being configured to move in the sub-scanning direction relative to the plurality of reading devices, and
    the plurality of position reference members including
        one or more first position reference members for correcting the relative positions of the plurality of reading devices, the number of the one or more first position reference numbers being less than the number of the plurality of reading devices by one, and
        a plurality of second position reference members for correcting the relative positions of the plurality of pixels in each of the plurality of reading devices, the number of the plurality of second position reference members being equal to the number of the plurality of reading devices; and
    circuitry configured to, based on a result of reading of the plurality of position reference members by the plurality of reading devices, calculate a correction value corresponding to a deviation of the relative positions of the plurality of pixels in each of the plurality of reading devices and a correction value corresponding to a deviation of the relative positions of the plurality of reading devices, while switching between the one or more first position reference members and the plurality of second position reference members.

2. The image reading device of claim 1, wherein the circuitry
    calculates a deviation in the main scanning direction of the relative positions of the plurality of reading devices based on a plurality of vertical lines included in the reference pattern of each of the one or more first position reference members,
    calculates a deviation in the sub-scanning direction of the relative positions of the plurality of reading devices based on a plurality of horizontal lines included in the reference pattern of each of the one or more first position reference members,
    calculates a deviation in the main scanning direction of the relative positions of the plurality of pixels in each of the plurality of reading devices based on a plurality of vertical lines included in the reference pattern of each of the plurality of second position reference members, and
    calculates a deviation in the sub-scanning direction of the relative positions of the plurality of pixels in each of the plurality of reading devices based on a plurality of horizontal lines included in the reference pattern of each of the plurality of second position reference members.

3. The image reading device of claim 2, wherein the circuitry corrects tilt of each of the one or more first position reference members based on the deviation in the sub-scanning direction of the relative positions of the plurality of reading devices.

4. The image reading device of claim 2, wherein the circuitry corrects tilt of each of the plurality of second position reference members based on the deviation in the sub-scanning direction of the relative positions of the plurality of pixels in each of the plurality of reading devices.

5. The image reading device of claim 2, wherein the circuitry calculates an amount of deviation in the sub-scanning direction of each of the plurality of second position reference members from the one or more first position reference members, and corrects a relative deviation in the sub-scanning direction of each of the plurality of second position reference members from the one or more first position reference members.

6. The image reading device of claim 2, wherein the circuitry calculates a tilt angle between the plurality of second position reference members, and corrects a relative deviation in the sub-scanning direction between the plurality of second position reference members.

7. The image reading device of claim 1, further comprising a reference module when the number of the plurality of reading devices is equal to or larger than three,
the reference module including one first position reference member of the one or more first position reference members and two second position reference members of the plurality of second position reference members, and
the reference module being configured to slide in the main scanning direction, and disposed to correct relative positions of two adjacent reading devices of the plurality of reading devices.

8. An image forming apparatus comprising:
the image reading device of claim 1; and
a print engine.

9. An image reading method performed by an image reading device
the image reading device including
a plurality of reading devices arranged in a main scanning direction perpendicular to a sub-scanning direction in which a reading target is transported, and
a plurality of position reference members each including a reference pattern as a reference for correcting relative positions of a plurality of pixels in each of the plurality of reading devices or relative positions of the plurality of reading devices,
the plurality of position reference members partially overlapping the plurality of reading devices, and being configured to move in the sub-scanning direction relative to the plurality of reading devices, and
the plurality of position reference members including
one or more first position reference members for correcting the relative positions of the plurality of reading devices, the number of the one or more first position reference numbers being less than the number of the plurality of reading devices by one, and
a plurality of second position reference members for correcting the relative positions of the plurality of pixels in each of the plurality of reading devices, the number of the plurality of second position reference members being equal to the number of the plurality of reading devices, and the image reading method comprising:
reading the plurality of position reference members with the plurality of reading devices to obtain a reading result; and
calculating a correction value corresponding to a deviation of the relative positions of the plurality of pixels in each of the plurality of reading devices and a correction value corresponding to a deviation of the relative positions of the plurality of reading devices, while switching between the one or more first position reference members and the plurality of second position reference members.

10. The image reading method of claim 9, further comprising:
calculating a deviation in the main scanning direction of the relative positions of the plurality of reading devices based on a plurality of vertical lines included in the reference pattern of each of the one or more first position reference members;
calculating a deviation in the sub-scanning direction of the relative positions of the plurality of reading devices based on a plurality of horizontal lines included in the reference pattern of each of the one or more first position reference members;
calculating a deviation in the main scanning direction of the relative positions of the plurality of pixels in each of the plurality of reading devices based on a plurality of vertical lines included in the reference pattern of each of the plurality of second position reference members; and
calculating a deviation in the sub-scanning direction of the relative positions of the plurality of pixels in each of the plurality of reading devices based on a plurality of horizontal lines included in the reference pattern of each of the plurality of second position reference members.

11. The image reading method of claim 10, further comprising:
correcting tilt of each of the one or more first position reference members based on the deviation in the sub-scanning direction of the relative positions of the plurality of reading devices.

12. The image reading method of claim 10, further comprising:
correcting tilt of each of the plurality of second position reference members based on the deviation in the sub-scanning direction of the relative positions of the plurality of pixels in each of the plurality of reading devices.

13. The image reading method of claim 10, further comprising:
calculating an amount of deviation in the sub-scanning direction of each of the plurality of second position reference members from the one or more first position reference members; and
correcting a relative deviation in the sub-scanning direction of each of the plurality of second position reference members from the one or more first position reference members.

14. The image reading method of claim 10, further comprising:
calculating a tilt angle between the plurality of second position reference members; and
correcting a relative deviation in the sub-scanning direction between the plurality of second position reference members.

15. The image reading method of claim 9, wherein when the number of the plurality of reading devices is equal to or larger than three, the image reading device further includes a reference module including one first position reference member of the one or more first position reference members and two second position reference members of the plurality of second position reference members, and disposed to correct relative positions of two adjacent reading devices of the plurality of reading devices, and wherein the image reading method further comprises moving the reference module in the main scanning direction.

* * * * *